US009886309B2

(12) United States Patent
Alles et al.

(10) Patent No.: US 9,886,309 B2
(45) Date of Patent: Feb. 6, 2018

(54) IDENTITY-BASED DISTRIBUTED COMPUTING FOR DEVICE RESOURCES

(75) Inventors: David Alles, Seattle, WA (US); George M. Moore, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 975 days.

(21) Appl. No.: 10/187,221

(22) Filed: Jun. 28, 2002

(65) Prior Publication Data

US 2004/0003112 A1 Jan. 1, 2004

(51) Int. Cl.
*G06F 15/16* (2006.01)
*G06F 9/50* (2006.01)
*H04L 29/06* (2006.01)
*H04L 29/08* (2006.01)

(52) U.S. Cl.
CPC ............ *G06F 9/5011* (2013.01); *H04L 29/06* (2013.01); *H04L 67/16* (2013.01); *H04L 67/303* (2013.01); *H04L 67/306* (2013.01); *H04L 69/329* (2013.01)

(58) Field of Classification Search
CPC ............................... G06F 9/5011; H04L 29/06
USPC ...................... 709/226, 229; 726/5
See application file for complete search history.

(56) References Cited

U.S. PATENT DOCUMENTS

| 5,031,089 | A | 7/1991 | Liu et al. |
|---|---|---|---|
| 5,218,680 | A | 6/1993 | Farrell et al. |
| 5,440,744 | A | 8/1995 | Jacobson et al. |
| 5,446,880 | A | 8/1995 | Balgeman et al. |
| 5,485,409 | A | 1/1996 | Gupta |
| 5,487,141 | A | 1/1996 | Cain |
| 5,493,692 | A | 2/1996 | Theimer |
| 5,544,285 | A | 8/1996 | Glaser |
| 5,544,302 | A | 8/1996 | Nguyen |
| 5,557,320 | A | 9/1996 | Krebs |
| 5,634,053 | A | 5/1997 | Noble et al. |
| 5,634,129 | A | 5/1997 | Dickinson |
| 5,640,504 | A | 6/1997 | Johnson |
| 5,640,569 | A | 6/1997 | Miller |
| 5,666,534 | A | 9/1997 | Gilbert et al. |

(Continued)

FOREIGN PATENT DOCUMENTS

| CA | 2428481 | 11/2011 |
|---|---|---|
| DE | 2117811 | 10/1972 |

(Continued)

OTHER PUBLICATIONS

Anonymous, International Search Report in Corresponding EP Application No. EP 03 00 9717.

(Continued)

*Primary Examiner* — Douglas Blair

(57) ABSTRACT

A system, method and related data structures for discovering and describing computing resources available at various computing devices, and for exposing those resources as services that are addressable by software applications. The data describing the resources is arranged according to an identity-based schema. The computing resources may include, for example, storage capacity, bandwidth, processing power, input methods and mechanism, and rendering methods. The method and system are identity-based, whereby a user (with an identity) has access to the distributed resources commensurate with that identity.

15 Claims, 7 Drawing Sheets

(56) References Cited

U.S. PATENT DOCUMENTS

| | | |
|---|---|---|
| 5,684,950 A | 11/1997 | Dare |
| 5,687,376 A | 11/1997 | Celi et al. |
| 5,691,917 A | 11/1997 | Harrison |
| 5,729,682 A | 3/1998 | Marquis |
| 5,742,905 A | 4/1998 | Pepe et al. |
| 5,748,890 A | 5/1998 | Goldberg |
| 5,754,111 A | 5/1998 | Garcia |
| 5,754,175 A | 5/1998 | Koppolu |
| 5,778,227 A | 7/1998 | Jordan |
| 5,787,283 A | 7/1998 | Chin et al. |
| 5,787,412 A | 7/1998 | Bosch et al. |
| 5,787,427 A | 7/1998 | Benatar et al. |
| 5,790,785 A | 8/1998 | Klug et al. |
| 5,790,790 A | 8/1998 | Smith et al. |
| 5,809,509 A | 9/1998 | Blackman et al. |
| 5,819,092 A | 10/1998 | Ferguson et al. |
| 5,826,252 A | 10/1998 | Wolters et al. |
| 5,835,722 A | 11/1998 | Bradshaw et al. |
| 5,862,325 A | 1/1999 | Reed et al. |
| 5,864,848 A | 1/1999 | Horvitz et al. |
| 5,864,870 A | 1/1999 | Guck |
| 5,867,712 A | 2/1999 | Shaw et al. |
| 5,867,799 A | 2/1999 | Lang et al. |
| 5,870,739 A | 2/1999 | Davis, III et al. |
| 5,870,759 A | 2/1999 | Bauer et al. |
| 5,872,926 A | 2/1999 | Levac et al. |
| 5,898,870 A | 4/1999 | Okuda et al. |
| 5,911,139 A | 6/1999 | Jain et al. |
| 5,911,143 A | 6/1999 | Deinhart et al. |
| 5,926,810 A | 7/1999 | Noble et al. |
| 5,930,801 A | 7/1999 | Falkenhainer |
| 5,933,820 A | 8/1999 | Beier et al. |
| 5,937,189 A | 8/1999 | Branson et al. |
| 5,944,823 A | 8/1999 | Jade |
| 5,956,715 A | 9/1999 | Glasser et al. |
| 5,956,730 A | 9/1999 | Burroughs et al. |
| 5,963,976 A | 10/1999 | Ogawa et al. |
| 5,974,416 A | 10/1999 | Anand et al. |
| 5,974,417 A | 10/1999 | Bracho et al. |
| 5,983,234 A | 11/1999 | Tietjen |
| 5,983,273 A | 11/1999 | White et al. |
| 5,987,454 A | 11/1999 | Hobbs |
| 5,990,883 A | 11/1999 | Byrne et al. |
| 5,999,932 A | 12/1999 | Paul |
| 6,003,079 A | 12/1999 | Friedrich et al. |
| 6,011,537 A | 1/2000 | Slotznick |
| 6,016,394 A | 1/2000 | Walker |
| 6,018,343 A | 1/2000 | Wang et al. |
| 6,021,403 A | 2/2000 | Horvitz et al. |
| 6,023,223 A | 2/2000 | Baxter, Jr. |
| 6,023,765 A | 2/2000 | Kuhn |
| 6,044,224 A | 3/2000 | Radia et al. |
| 6,044,372 A | 3/2000 | Rothfus et al. |
| 6,047,307 A | 4/2000 | Radko |
| 6,047,327 A | 4/2000 | Tso |
| 6,049,821 A | 4/2000 | Theriault et al. |
| 6,052,720 A | 4/2000 | Traversat et al. |
| 6,065,012 A | 5/2000 | Balsara et al. |
| 6,078,955 A | 6/2000 | Konno et al. |
| 6,081,840 A | 6/2000 | Zhao |
| 6,088,451 A * | 7/2000 | He et al. .......... 726/8 |
| 6,088,675 A | 7/2000 | MacKenty et al. |
| 6,088,717 A | 7/2000 | Reed et al. |
| 6,092,101 A | 7/2000 | Birrell et al. |
| 6,101,480 A | 8/2000 | Conmy et al. |
| 6,106,573 A | 8/2000 | Mahalingaiah et al. |
| 6,119,122 A | 9/2000 | Bunnell |
| 6,122,348 A | 9/2000 | French-St. George et al. |
| 6,122,629 A | 9/2000 | Walker |
| 6,134,592 A | 10/2000 | Montulli |
| 6,141,778 A | 10/2000 | Kane et al. |
| 6,144,996 A | 11/2000 | Starnes et al. |
| 6,148,290 A | 11/2000 | Dan et al. |
| 6,148,301 A | 11/2000 | Rosenthal |
| 6,148,302 A | 11/2000 | Beylin et al. |
| 6,148,336 A | 11/2000 | Thomas et al. |
| 6,151,624 A | 11/2000 | Teare et al. |
| 6,154,876 A | 11/2000 | Haley et al. |
| 6,161,125 A | 12/2000 | Traversat et al. |
| 6,161,139 A | 12/2000 | Win et al. |
| 6,163,794 A | 12/2000 | Lange et al. |
| 6,167,402 A | 12/2000 | Yeager |
| 6,167,408 A | 12/2000 | Cannon et al. |
| 6,169,897 B1 | 1/2001 | Kariya |
| 6,185,551 B1 | 2/2001 | Birrell et al. |
| 6,189,032 B1 | 2/2001 | Susaki et al. |
| 6,192,380 B1 | 2/2001 | Light et al. |
| 6,192,408 B1 | 2/2001 | Vahalia et al. |
| 6,195,662 B1 | 2/2001 | Ellis et al. |
| 6,199,081 B1 | 3/2001 | Meyerzon |
| 6,202,066 B1 | 3/2001 | Barkley et al. |
| 6,223,207 B1 | 4/2001 | Lucovsky |
| 6,226,642 B1 | 5/2001 | Beranek et al. |
| 6,226,792 B1 | 5/2001 | Goiffon et al. |
| 6,243,830 B1 | 6/2001 | Nakatsugawa |
| 6,247,026 B1 | 6/2001 | Waldo |
| 6,253,204 B1 | 6/2001 | Glass et al. |
| 6,263,498 B1 | 7/2001 | Alcorn et al. |
| 6,266,690 B1 | 7/2001 | Shankarappa et al. |
| 6,269,369 B1 | 7/2001 | Robertson |
| 6,272,506 B1 | 8/2001 | Bell |
| 6,275,824 B1 | 8/2001 | O'Flaherty et al. |
| 6,279,111 B1 | 8/2001 | Jensenworth et al. |
| 6,282,548 B1 | 8/2001 | Burner et al. |
| 6,282,698 B1 | 8/2001 | Baker et al. |
| 6,282,709 B1 | 8/2001 | Reha et al. |
| 6,308,216 B1 | 10/2001 | Goldszmidt et al. |
| 6,308,273 B1 | 10/2001 | Goertzel et al. |
| 6,314,093 B1 | 11/2001 | Mann et al. |
| 6,314,447 B1 * | 11/2001 | Lea et al. .......... 718/105 |
| 6,314,555 B1 | 11/2001 | Ndumu et al. |
| 6,317,131 B2 | 11/2001 | Basso |
| 6,317,783 B1 | 11/2001 | Freishtat et al. |
| 6,317,868 B1 | 11/2001 | Grimm et al. |
| 6,324,544 B1 | 11/2001 | Alam et al. |
| 6,327,574 B1 | 12/2001 | Kramer |
| 6,330,610 B1 | 12/2001 | Docter |
| 6,334,151 B1 | 12/2001 | Bolam et al. |
| 6,336,118 B1 | 1/2002 | Hammond |
| 6,336,119 B1 | 1/2002 | Banavar et al. |
| 6,336,147 B1 | 1/2002 | Brownell et al. |
| 6,343,287 B1 | 1/2002 | Kumar et al. |
| 6,343,324 B1 | 1/2002 | Hubis et al. |
| 6,345,279 B1 | 2/2002 | Li |
| 6,349,302 B1 | 2/2002 | Aoyama et al. |
| 6,349,307 B1 | 2/2002 | Chen |
| 6,351,744 B1 | 2/2002 | Landresse et al. |
| 6,351,843 B1 | 2/2002 | Berkley et al. |
| 6,356,940 B1 | 3/2002 | Short |
| 6,360,252 B1 | 3/2002 | Rudy et al. |
| 6,370,537 B1 | 4/2002 | Gilbert et al. |
| 6,377,952 B1 | 4/2002 | Inohara |
| 6,381,465 B1 | 4/2002 | Chern et al. |
| 6,389,472 B1 | 5/2002 | Hughes et al. |
| 6,397,246 B1 | 5/2002 | Wolfe |
| 6,401,085 B1 | 6/2002 | Gershman et al. |
| 6,405,191 B1 | 6/2002 | Bhatt et al. |
| 6,405,364 B1 | 6/2002 | Bowman-Amuah |
| 6,414,635 B1 | 7/2002 | Stewart et al. |
| 6,415,322 B1 | 7/2002 | Jaye |
| 6,442,549 B1 | 8/2002 | Schneider |
| 6,446,118 B1 | 9/2002 | Gottlieb |
| 6,453,317 B1 | 9/2002 | LaCost et al. |
| 6,457,066 B1 | 9/2002 | Mein et al. |
| 6,459,913 B2 | 10/2002 | Cloutier |
| 6,463,462 B1 | 10/2002 | Smith |
| 6,466,232 B1 | 10/2002 | Newell et al. |
| 6,470,450 B1 | 10/2002 | Langford |
| 6,480,830 B1 | 11/2002 | Ford et al. |
| 6,480,850 B1 | 11/2002 | Veldhuisen |
| 6,480,860 B1 | 11/2002 | Monday |
| 6,480,885 B1 | 11/2002 | Olivier |
| 6,487,584 B1 | 11/2002 | Bunney |
| 6,490,721 B1 | 12/2002 | Gorshkov et al. |

(56) References Cited

U.S. PATENT DOCUMENTS

| | | |
|---|---|---|
| 6,505,167 B1 | 1/2003 | Horvitz et al. |
| 6,510,439 B1 | 1/2003 | Rangarajan et al. |
| 6,516,315 B1 | 2/2003 | Gupta |
| 6,516,341 B2 | 2/2003 | Shaw et al. |
| 6,519,571 B1 | 2/2003 | Guheen et al. |
| 6,526,438 B1 | 2/2003 | Bienvenu et al. |
| 6,539,481 B1 * | 3/2003 | Takahashi et al. ............... 726/5 |
| 6,542,515 B1 | 4/2003 | Kumar et al. |
| 6,542,845 B1 | 4/2003 | Grucci et al. |
| 6,542,912 B2 | 4/2003 | Meltzer et al. |
| 6,542,923 B2 | 4/2003 | Nguyen |
| 6,543,317 B1 | 4/2003 | Rinner et al. |
| 6,553,427 B1 | 4/2003 | Chang et al. |
| 6,556,995 B1 | 4/2003 | Child |
| 6,566,995 B2 | 5/2003 | Furuuchi |
| 6,571,279 B1 | 5/2003 | Herz et al. |
| 6,574,631 B1 | 6/2003 | Subramanian et al. |
| 6,574,655 B1 | 6/2003 | Libert et al. |
| 6,581,095 B1 | 6/2003 | Kim |
| 6,584,564 B2 | 6/2003 | Olkin et al. |
| 6,591,260 B1 | 7/2003 | Schwarzhoff et al. |
| 6,594,666 B1 | 7/2003 | Biswas et al. |
| 6,594,672 B1 | 7/2003 | Lampson et al. |
| 6,601,016 B1 | 7/2003 | Brown |
| 6,601,075 B1 | 7/2003 | Huang et al. |
| 6,601,233 B1 | 7/2003 | Underwood |
| 6,604,099 B1 | 8/2003 | Chung et al. |
| 6,604,143 B1 | 8/2003 | Nagar et al. |
| 6,604,209 B1 | 8/2003 | Grucci et al. |
| 6,609,148 B1 | 8/2003 | Salo et al. |
| 6,618,716 B1 | 9/2003 | Horvitz |
| 6,622,160 B1 | 9/2003 | Horvitz et al. |
| 6,633,898 B1 * | 10/2003 | Seguchi et al. ............... 709/201 |
| 6,643,650 B1 | 11/2003 | Slaughter et al. |
| 6,643,652 B2 | 11/2003 | Helgeson et al. |
| 6,651,217 B1 | 11/2003 | Kennedy et al. |
| 6,654,747 B1 | 11/2003 | Van Huben et al. |
| 6,662,340 B2 | 12/2003 | Rawat et al. |
| 6,662,357 B1 | 12/2003 | Bowman-Amuah |
| 6,665,756 B2 | 12/2003 | Abramson et al. |
| 6,678,682 B1 | 1/2004 | Jenkins et al. |
| 6,678,715 B1 * | 1/2004 | Ando ............... 718/105 |
| 6,684,204 B1 | 1/2004 | Lal |
| 6,686,838 B1 | 2/2004 | Rezvani et al. |
| 6,694,429 B1 | 2/2004 | Kalmanek et al. |
| 6,697,809 B2 | 2/2004 | Chen et al. |
| 6,697,865 B1 | 2/2004 | Howard et al. |
| 6,704,024 B2 | 3/2004 | Robotham et al. |
| 6,708,137 B2 | 3/2004 | Carley |
| 6,708,217 B1 | 3/2004 | Colson |
| 6,711,585 B1 | 3/2004 | Copperman et al. |
| 6,711,612 B1 | 3/2004 | Blumenau et al. |
| 6,714,967 B1 | 3/2004 | Horvitz |
| 6,718,535 B1 | 4/2004 | Underwood |
| 6,721,941 B1 | 4/2004 | Morshed et al. |
| 6,731,940 B1 | 5/2004 | Nagendran |
| 6,732,080 B1 | 5/2004 | Blants |
| 6,738,767 B1 | 5/2004 | Chung et al. |
| 6,741,980 B1 | 5/2004 | Langseth |
| 6,745,011 B1 | 6/2004 | Hendrickson et al. |
| 6,748,417 B1 | 6/2004 | Helland et al. |
| 6,754,470 B2 | 6/2004 | Hendrickson et al. |
| 6,757,720 B1 | 6/2004 | Weschler |
| 6,757,898 B1 | 6/2004 | Ilsen et al. |
| 6,763,384 B1 | 7/2004 | Gupta et al. |
| 6,766,362 B1 | 7/2004 | Miyasaka |
| 6,772,216 B1 | 8/2004 | Ankireddipally et al. |
| 6,789,077 B1 | 9/2004 | Slaughter et al. |
| 6,789,126 B1 | 9/2004 | Saulpaugh et al. |
| 6,792,446 B2 | 9/2004 | Merchant et al. |
| 6,792,466 B1 | 9/2004 | Saulpaugh et al. |
| 6,792,605 B1 | 9/2004 | Roberts et al. |
| 6,807,558 B1 | 10/2004 | Hassett et al. |
| 6,816,878 B1 | 11/2004 | Zimmers et al. |
| 6,816,886 B2 | 11/2004 | Elvanoglu |
| 6,820,082 B1 | 11/2004 | Cook et al. |
| 6,820,204 B1 | 11/2004 | Desai et al. |
| 6,823,369 B2 | 11/2004 | Leach |
| 6,823,458 B1 | 11/2004 | Lee et al. |
| 6,823,495 B1 | 11/2004 | Vedula et al. |
| 6,829,593 B1 | 12/2004 | Ritter et al. |
| 6,832,237 B1 | 12/2004 | Christensen et al. |
| 6,839,733 B1 | 1/2005 | Lange et al. |
| 6,850,975 B1 | 2/2005 | Danneels et al. |
| 6,850,979 B1 | 2/2005 | Saulpaugh et al. |
| 6,857,013 B2 | 2/2005 | Ramberg |
| 6,862,594 B1 | 3/2005 | Saulpaugh et al. |
| 6,868,447 B1 | 3/2005 | Slaughter et al. |
| 6,882,706 B2 | 4/2005 | Andrew |
| 6,892,201 B2 | 5/2005 | Brown et al. |
| 6,898,618 B1 | 5/2005 | Slaughter et al. |
| 6,907,457 B2 | 6/2005 | Merrell et al. |
| 6,907,465 B1 | 6/2005 | Tsai |
| 6,911,143 B2 | 6/2005 | Janik |
| 6,912,600 B2 * | 6/2005 | Van Brero et al. ............... 710/8 |
| 6,917,373 B2 | 7/2005 | Vong et al. |
| 6,917,937 B1 | 7/2005 | Rubendall |
| 6,917,976 B1 | 7/2005 | Slaughter et al. |
| 6,918,084 B1 | 7/2005 | Slaughter et al. |
| 6,925,307 B1 | 8/2005 | Mamdani et al. |
| 6,925,481 B2 | 8/2005 | Singhal et al. |
| 6,931,434 B1 | 8/2005 | Donoho et al. |
| 6,934,740 B1 | 8/2005 | Lawande et al. |
| 6,944,658 B1 | 9/2005 | Schneider |
| 6,957,199 B1 | 10/2005 | Fisher |
| 6,958,984 B2 * | 10/2005 | Kotzin ............... 370/335 |
| 6,976,078 B1 | 12/2005 | Icken |
| 6,980,993 B2 | 12/2005 | Horvitz et al. |
| 6,981,247 B2 | 12/2005 | Weinberg et al. |
| 6,985,958 B2 | 1/2006 | Lucovsky |
| 6,986,145 B2 | 1/2006 | Gangopadhyay |
| 6,990,513 B2 | 1/2006 | Belfiore et al. |
| 6,993,502 B1 | 1/2006 | Gryglewicz et al. |
| 7,002,942 B2 * | 2/2006 | Kotzin ............... 370/338 |
| 7,017,016 B2 | 3/2006 | Chujo |
| 7,024,662 B2 | 4/2006 | Elvanoglu |
| 7,024,692 B1 | 4/2006 | Schanze et al. |
| 7,027,051 B2 * | 4/2006 | Alford et al. ............... 345/440 |
| 7,028,312 B1 | 4/2006 | Merrick et al. |
| 7,031,945 B1 | 4/2006 | Donner |
| 7,061,928 B2 | 6/2006 | Giroti |
| 7,062,539 B2 | 6/2006 | Leach |
| 7,062,642 B1 * | 6/2006 | Langrind et al. ............... 713/1 |
| 7,069,446 B2 | 6/2006 | Wiederin et al. |
| 7,072,843 B2 | 7/2006 | Menninger |
| 7,072,967 B1 | 7/2006 | Saulpaugh et al. |
| 7,113,771 B2 * | 9/2006 | Kotzin ............... 455/414.1 |
| 7,127,328 B2 | 10/2006 | Ransom |
| 7,127,514 B2 | 10/2006 | Hunt |
| 7,133,869 B2 | 11/2006 | Bryan |
| 7,136,859 B2 | 11/2006 | Lucovsky |
| 7,136,908 B2 | 11/2006 | Cline et al. |
| 7,143,118 B2 | 11/2006 | Eichstaedt et al. |
| 7,149,806 B2 * | 12/2006 | Perkins et al. ............... 709/229 |
| 7,170,857 B2 * | 1/2007 | Stephens et al. ............... 370/230 |
| 7,191,236 B2 | 3/2007 | Simpson-Young |
| 7,203,906 B2 | 4/2007 | Abbott |
| 7,206,788 B2 | 4/2007 | Horvitz |
| 7,207,008 B1 | 4/2007 | Koch |
| 7,210,147 B1 | 4/2007 | Hipp et al. |
| 7,216,287 B2 | 5/2007 | Colson et al. |
| 7,219,163 B2 | 5/2007 | Robinson |
| 7,222,306 B2 * | 5/2007 | Kaasila et al. ............... 715/801 |
| 7,243,130 B2 | 7/2007 | Horvitz |
| 7,246,122 B2 | 7/2007 | Lucovsky |
| 7,249,159 B1 | 7/2007 | Horvitz et al. |
| 7,250,846 B2 | 7/2007 | Ebling et al. |
| 7,260,601 B1 | 8/2007 | Day |
| 7,277,951 B2 | 10/2007 | Marriott |
| 7,284,197 B2 | 10/2007 | Lucovsky |
| 7,284,271 B2 | 10/2007 | Lucovsky |
| 7,302,402 B2 | 11/2007 | Callaghan et al. |
| 7,302,634 B2 | 11/2007 | Lucovsky et al. |
| 7,346,668 B2 | 3/2008 | Willis |

(56) References Cited

U.S. PATENT DOCUMENTS

| | | |
|---|---|---|
| 7,418,472 B2 | 8/2008 | Shoemaker |
| 7,457,879 B2 | 11/2008 | Horvitz |
| 7,472,349 B1 | 12/2008 | Srivastava et al. |
| 7,487,233 B2 * | 2/2009 | Iwamoto et al. ............ 709/223 |
| 7,496,630 B2 | 2/2009 | Arellano |
| 7,502,384 B2 | 3/2009 | Trossen |
| 7,539,747 B2 | 5/2009 | Lucovsky et al. |
| 7,545,762 B1 | 6/2009 | McConnell |
| 7,548,932 B2 | 6/2009 | Horvitz et al. |
| 7,613,702 B2 | 11/2009 | Horvitz et al. |
| 7,613,721 B2 | 11/2009 | Horvitz et al. |
| 7,613,722 B2 | 11/2009 | Horvitz et al. |
| 7,664,724 B2 | 2/2010 | Lucovsky et al. |
| 7,721,110 B2 * | 5/2010 | Kouznetsov et al. ........ 713/187 |
| 7,921,155 B2 * | 4/2011 | Harrow et al. ............... 709/203 |
| 8,572,576 B2 | 10/2013 | Elvanoglu et al. |
| 8,862,736 B2 * | 10/2014 | Tagg ........................... 709/226 |
| 2001/0000958 A1 | 5/2001 | Ulrich |
| 2001/0023421 A1 | 9/2001 | Numao |
| 2001/0029470 A1 | 10/2001 | Schultz et al. |
| 2001/0044275 A1 | 11/2001 | Yamaguchi |
| 2001/0044827 A1 | 11/2001 | Zhuk |
| 2001/0047385 A1 | 11/2001 | Tuatini |
| 2002/0010781 A1 | 1/2002 | Tuatini |
| 2002/0012327 A1 | 1/2002 | Okada |
| 2002/0013711 A1 | 1/2002 | Ahuja et al. |
| 2002/0013788 A1 | 1/2002 | Pennell et al. |
| 2002/0015042 A1 | 2/2002 | Robotham et al. |
| 2002/0016173 A1 | 2/2002 | Hunzinger |
| 2002/0019828 A1 | 2/2002 | Mortl |
| 2002/0023156 A1 | 2/2002 | Chujo |
| 2002/0026426 A1 | 2/2002 | Bennett |
| 2002/0029256 A1 | 3/2002 | Zintel et al. |
| 2002/0032790 A1 | 3/2002 | Linderman et al. |
| 2002/0035533 A1 | 3/2002 | Mache et al. |
| 2002/0038455 A1 | 3/2002 | Srinivasan |
| 2002/0040369 A1 | 4/2002 | Multer et al. |
| 2002/0042846 A1 | 4/2002 | Bottan |
| 2002/0049749 A1 | 4/2002 | Helgeson et al. |
| 2002/0049817 A1 | 4/2002 | Drory et al. |
| 2002/0049902 A1 | 4/2002 | Rhodes |
| 2002/0055951 A1 | 5/2002 | Shigetomi et al. |
| 2002/0059342 A1 | 5/2002 | Gupta |
| 2002/0059425 A1 * | 5/2002 | Belfiore et al. ............... 709/226 |
| 2002/0063732 A1 | 5/2002 | Mansikkaniemi et al. |
| 2002/0065881 A1 | 5/2002 | Mansikkaniemi et al. |
| 2002/0065884 A1 | 5/2002 | Donoho |
| 2002/0069298 A1 | 6/2002 | Birkler et al. |
| 2002/0073158 A1 | 6/2002 | Dalal |
| 2002/0078204 A1 | 6/2002 | Newell et al. |
| 2002/0078378 A1 | 6/2002 | Burnett |
| 2002/0080156 A1 | 6/2002 | Abbott et al. |
| 2002/0080948 A1 | 6/2002 | Canali |
| 2002/0083048 A1 | 6/2002 | Tenorio et al. |
| 2002/0083073 A1 | 6/2002 | Vaidya |
| 2002/0083121 A1 | 6/2002 | Chang et al. |
| 2002/0083158 A1 | 6/2002 | Abbott et al. |
| 2002/0085579 A1 | 7/2002 | Sullivan |
| 2002/0087397 A1 | 7/2002 | Mazza |
| 2002/0087740 A1 | 7/2002 | Castanho |
| 2002/0090934 A1 | 7/2002 | Mitchelmore |
| 2002/0095399 A1 | 7/2002 | Devine et al. |
| 2002/0099573 A1 | 7/2002 | Koguchi et al. |
| 2002/0099593 A1 | 7/2002 | Kraft et al. |
| 2002/0099817 A1 | 7/2002 | Abbott et al. |
| 2002/0103661 A1 | 8/2002 | Albazz |
| 2002/0104017 A1 | 8/2002 | Stefan |
| 2002/0107985 A1 | 8/2002 | Hwang |
| 2002/0116232 A1 | 8/2002 | Rapp et al. |
| 2002/0116642 A1 | 8/2002 | Joshi et al. |
| 2002/0120685 A1 | 8/2002 | Srivastava et al. |
| 2002/0120711 A1 | 8/2002 | Bantz |
| 2002/0124182 A1 | 9/2002 | Bacso et al. |
| 2002/0129000 A1 | 9/2002 | Pillai et al. |
| 2002/0129016 A1 | 9/2002 | Christfort et al. |
| 2002/0129024 A1 | 9/2002 | Lee |
| 2002/0129140 A1 | 9/2002 | Kawazoe et al. |
| 2002/0129213 A1 | 9/2002 | Groudie |
| 2002/0131428 A1 | 9/2002 | Pecus et al. |
| 2002/0133477 A1 | 9/2002 | Abel |
| 2002/0133506 A1 | 9/2002 | Yamato |
| 2002/0133535 A1 | 9/2002 | Lucovsky et al. |
| 2002/0133627 A1 | 9/2002 | Maes et al. |
| 2002/0133752 A1 | 9/2002 | Hand |
| 2002/0138566 A1 | 9/2002 | Leach et al. |
| 2002/0152053 A1 | 10/2002 | Roy |
| 2002/0154161 A1 | 10/2002 | Friedman et al. |
| 2002/0157007 A1 | 10/2002 | Sashihara |
| 2002/0161838 A1 | 10/2002 | Pickover |
| 2002/0169876 A1 | 11/2002 | Curie et al. |
| 2002/0174125 A1 | 11/2002 | Lucovsky et al. |
| 2002/0184092 A1 | 12/2002 | Cherry |
| 2002/0184214 A1 | 12/2002 | Lucovsky et al. |
| 2002/0184344 A1 | 12/2002 | Elvanoglu et al. |
| 2002/0184521 A1 | 12/2002 | Lucovsky et al. |
| 2003/0004874 A1 | 1/2003 | Ludwig |
| 2003/0014659 A1 | 1/2003 | Zhu |
| 2003/0018771 A1 | 1/2003 | Vinberg et al. |
| 2003/0023623 A1 | 1/2003 | Horvitz et al. |
| 2003/0041000 A1 | 2/2003 | Zajac et al. |
| 2003/0041065 A1 | 2/2003 | Lucovsky et al. |
| 2003/0041076 A1 | 2/2003 | Lucovsky et al. |
| 2003/0046238 A1 | 3/2003 | Nonaka |
| 2003/0050911 A1 | 3/2003 | Lucovsky et al. |
| 2003/0055897 A1 | 3/2003 | Brown |
| 2003/0061081 A1 | 3/2003 | Kellond et al. |
| 2003/0061211 A1 | 3/2003 | Shultz et al. |
| 2003/0061365 A1 | 3/2003 | White et al. |
| 2003/0069887 A1 | 4/2003 | Lucovsky |
| 2003/0074247 A1 | 4/2003 | Dick |
| 2003/0074423 A1 | 4/2003 | Mayberry et al. |
| 2003/0097485 A1 | 5/2003 | Horvitz et al. |
| 2003/0100326 A1 | 5/2003 | Grube et al. |
| 2003/0101190 A1 | 5/2003 | Horvitz et al. |
| 2003/0110234 A1 | 6/2003 | Egli |
| 2003/0115228 A1 | 6/2003 | Horvitz et al. |
| 2003/0120785 A1 | 6/2003 | Young |
| 2003/0123465 A1 | 7/2003 | Donahue |
| 2003/0131069 A1 | 7/2003 | Lucovsky |
| 2003/0131073 A1 | 7/2003 | Lucovsky |
| 2003/0131142 A1 | 7/2003 | Horvitz et al. |
| 2003/0133553 A1 | 7/2003 | Khakoo et al. |
| 2003/0135411 A1 | 7/2003 | Ushiki et al. |
| 2003/0135556 A1 | 7/2003 | Holdsworth |
| 2003/0140112 A1 | 7/2003 | Ramachandran et al. |
| 2003/0149646 A1 | 8/2003 | Chen et al. |
| 2003/0149696 A1 | 8/2003 | Nelson et al. |
| 2003/0149781 A1 | 8/2003 | Yared et al. |
| 2003/0154476 A1 | 8/2003 | Abbott et al. |
| 2003/0165139 A1 | 9/2003 | Chen et al. |
| 2003/0167334 A1 | 9/2003 | Butler |
| 2003/0169749 A1 | 9/2003 | Huang et al. |
| 2003/0177135 A1 | 9/2003 | Lechowicz et al. |
| 2003/0177264 A1 | 9/2003 | Elvanoglu et al. |
| 2003/0220891 A1 | 11/2003 | Fish |
| 2003/0221014 A1 | 11/2003 | Kosiba et al. |
| 2003/0223449 A1 | 12/2003 | Hill |
| 2003/0229529 A1 | 12/2003 | Mui et al. |
| 2004/0002972 A1 | 1/2004 | Pather |
| 2004/0002976 A1 | 1/2004 | Lucovsky |
| 2004/0003112 A1 | 1/2004 | Alles |
| 2004/0006564 A1 | 1/2004 | Lucovsky et al. |
| 2004/0006590 A1 | 1/2004 | Lucovsky et al. |
| 2004/0010451 A1 | 1/2004 | Romano et al. |
| 2004/0015725 A1 | 1/2004 | Boneh et al. |
| 2004/0024866 A1 | 2/2004 | Sundar et al. |
| 2004/0024875 A1 | 2/2004 | Horvitz et al. |
| 2004/0060002 A1 | 3/2004 | Lucovsky et al. |
| 2004/0064571 A1 | 4/2004 | Nuuttila |
| 2004/0078273 A1 | 4/2004 | Loeb et al. |
| 2004/0083291 A1 | 4/2004 | Pessi |
| 2004/0098622 A1 | 5/2004 | O'Neill |
| 2004/0133622 A1 | 7/2004 | Clubb et al. |
| 2004/0139145 A1 | 7/2004 | Bar-or et al. |

(56) References Cited

U.S. PATENT DOCUMENTS

| | | |
|---|---|---|
| 2004/0156346 A1 | 8/2004 | O'Neill |
| 2004/0166834 A1 | 8/2004 | Omar et al. |
| 2004/0181550 A1 | 9/2004 | Warsta |
| 2004/0193444 A1 | 9/2004 | Hufford et al. |
| 2004/0199663 A1 | 10/2004 | Horvitz et al. |
| 2004/0199664 A1 | 10/2004 | Feldman |
| 2004/0199861 A1 | 10/2004 | Lucovsky |
| 2004/0199869 A1 | 10/2004 | Lucovsky |
| 2004/0205526 A1 | 10/2004 | Borodovski et al. |
| 2004/0205656 A1 | 10/2004 | Reulein et al. |
| 2004/0210839 A1 | 10/2004 | Lucovsky |
| 2004/0226001 A1 | 11/2004 | Teegan et al. |
| 2004/0242322 A1 | 12/2004 | Montagna |
| 2004/0243520 A1 | 12/2004 | Bishop et al. |
| 2004/0267687 A1 | 12/2004 | Aschen et al. |
| 2004/0267763 A1 | 12/2004 | Aschen et al. |
| 2004/0267965 A1 | 12/2004 | Vasudevan |
| 2005/0013417 A1 | 1/2005 | Zimmers et al. |
| 2005/0027741 A1 | 2/2005 | Eichstaedt |
| 2005/0065950 A1 | 3/2005 | Chaganti et al. |
| 2005/0080865 A1 | 4/2005 | Leach et al. |
| 2005/0080911 A1 | 4/2005 | Stiers |
| 2005/0097000 A1 | 5/2005 | Freishtat et al. |
| 2005/0100150 A1 | 5/2005 | Dhara et al. |
| 2005/0144266 A1 | 6/2005 | Antonelli |
| 2005/0165773 A1 | 7/2005 | Elvanoglu |
| 2005/0262434 A1 | 11/2005 | Soderberg |
| 2005/0273692 A1 | 12/2005 | Horvitz et al. |
| 2005/0278344 A1 | 12/2005 | Horvitz et al. |
| 2005/0278366 A1 | 12/2005 | Horvitz et al. |
| 2005/0289447 A1 | 12/2005 | Hadley et al. |
| 2006/0003780 A1 | 1/2006 | Mamdani |
| 2006/0010078 A1 | 1/2006 | Rezvani et al. |
| 2006/0036642 A1 | 2/2006 | Horvitz et al. |
| 2006/0107251 A1 | 5/2006 | Boshier et al. |
| 2006/0133385 A1 | 6/2006 | Trossen |
| 2006/0150140 A1 | 7/2006 | Elvanoglu |
| 2006/0161554 A1 | 7/2006 | Lucovsky |
| 2007/0026857 A1* | 2/2007 | Kotzin ............... 455/426.1 |
| 2007/0083561 A1 | 4/2007 | Lai |
| 2007/0150903 A1 | 6/2007 | Hansen |
| 2007/0198691 A1 | 8/2007 | Koch |
| 2007/0216687 A1* | 9/2007 | Kaasila et al. ............ 345/441 |
| 2017/0017529 A1 | 1/2017 | Elvanoglu et al. |

FOREIGN PATENT DOCUMENTS

| | | |
|---|---|---|
| EP | 925128 | 5/1963 |
| EP | 0147574 | 7/1985 |
| EP | 0457920 | 11/1991 |
| EP | 0893920 | 1/1999 |
| EP | 0917119 | 5/1999 |
| EP | 0952513 | 10/1999 |
| EP | 0952513 A1 | 10/1999 |
| EP | 0991005 | 4/2000 |
| EP | 1021021 | 7/2000 |
| EP | 1 376 977 B1 | 8/2007 |
| EP | 1376977 | 8/2007 |
| EP | 1379971 | 2/2012 |
| HU | 228610 | 6/2013 |
| JP | 6293904 | 10/1994 |
| JP | 11143827 | 5/1999 |
| JP | 2000163345 | 6/2000 |
| JP | 2002055896 | 2/2002 |
| NO | 329278 | 9/2010 |
| WO | WO-9741654 | 11/1997 |
| WO | WO-9838585 | 9/1998 |
| WO | WO-9917216 | 4/1999 |
| WO | WO-9923591 | 5/1999 |
| WO | PCT/US00/04 | 8/2000 |
| WO | WO-0051031 | 8/2000 |
| WO | WO 0051031 A | 8/2000 |
| WO | WO-0184301 | 11/2001 |
| WO | WO-0186486 | 11/2001 |
| WO | WO-02073339 | 9/2002 |
| WO | WO-02073392 | 9/2002 |
| WO | WO-02073442 | 9/2002 |
| WO | WO-02073454 | 9/2002 |
| WO | WO-02073466 | 9/2002 |
| WO | WO-02073472 | 9/2002 |
| WO | WO-02079921 | 10/2002 |
| WO | WO-03096209 | 11/2003 |

OTHER PUBLICATIONS

Anonymous, New Zealand Search Report in Corresponding New Zealand Application No. 525694.

Danish Patent and Trademark Office, Search Report and Written Opinion in Application No. SG 200302729-9.

U.S. Appl. No. 60/379,864 "Process Programming Language", first named inventor—L. Meredith, filed May 10, 2002.

Federal Institute of Industrial Property "Search report" request No. TR 04/508, for Application No. 2003/00769, established by The Russian Patent Office, Date of mailing of the search report Mar. 14, 2005, Authorized officer V. Kirillov.

"Notice of Intention to Grant/Examination Report", Turkish Application No. 03/769, (dated Jan. 18, 2010),3 pages.

"Russian Search Report", Turkish Patent Application No. 2003/00769, (dated Nov. 14, 2004),2 pages.

"EP Search Report", European Patent Application No. 03009717.4, (dated Dec. 2, 2003),4 pages.

"Foreign Office Action", Polish Application No. P360329, (dated May 25, 2010),3 pages.

"Advisory Action", U.S. Appl. No. 10/021,316, (dated Apr. 14, 2005), 3 pages.

"Advisory Action", U.S. Appl. No. 10/021,563, (dated Sep. 19,2005), 3 pages.

"Advisory Action", U.S. Appl. No. 10/209,831, (dated Feb. 14, 2006), 3 pages.

"Advisory Action", U.S. Appl. No. 11/086,590, (dated Apr. 28, 2009), 3 pages.

"Advisory Action", U.S. Appl. No. 10/003,750, (dated Jan. 31, 2008), 3 pages.

"Advisory Action", U.S. Appl. No. 10/017,680, (dated May 8, 2007), 3 pages.

"Advisory Action", U.S. Appl. No. 10/017,680, (dated Oct. 13, 2005), 3 pages.

"Advisory Action", U.S. Appl. No. 10/187,057, (dated Sep. 29, 2006), 3 pages.

"Advisory Action", U.S. Appl. No. 10/187,057, (dated Oct. 26, 2005), 3 pages.

"Advisory Action", U.S. Appl. No. 10/187,210, (dated Oct. 20, 2005), 3 pages.

"Advisory Action", U.S. Appl. No. 10/187,216, (dated Dec. 16, 2005), 3 pages.

"Advisory Action", U.S. Appl. No. 10/213,525, (dated Aug. 23, 2007), 3 pages.

"Advisory Action", U.S. Appl. No. 10/243,310, (dated Sep. 21, 2006), 3 pages.

"Advisory Action", U.S. Appl. No. 10/243,310, (dated Oct. 27, 2005), 3 pages.

"COBRA Components—vol. 1", *Object Management Group* XP002260124, (Aug. 1999), pp. 1-462.

"Final Office Action", U.S. Appl. No. 10/003,753, (dated Sep. 23, 2005), 30 pages.

"Final Office Action", U.S. Appl. No. 10/003,767, (dated May 24, 2006), 21 pages.

"Final Office Action", U.S. Appl. No. 10/021,264, (dated Dec. 2, 2005),18 pages.

"Final Office Action", U.S. Appl. No. 10/021,291, (dated Jan. 18, 2006),15 pages.

"Final Office Action", U.S. Appl. No. 10/021,316, (dated Nov. 30, 2004),13 pages.

"Final Office Action", U.S. Appl. No. 10/021,316, (dated Dec. 4, 2006),12 pages.

"Final Office Action", U.S. Appl. No. 10/021,316, (dated Dec. 30, 2005),15 pages.

(56) References Cited

OTHER PUBLICATIONS

"Final Office Action", U.S. Appl. No. 10/021,563, (dated Apr. 7, 2005), 23 pages.
"Final Office Action", U.S. Appl. No. 10/062,045, (dated Sep. 2, 2005),11 pages.
"Final Office Action", U.S. Appl. No. 10/187,061, (dated Feb. 22, 2007),15 pages.
"Final Office Action", U.S. Appl. No. 10/187,061, (dated Mar. 2, 2009),18 pages.
"Final Office Action", U.S. Appl. No. 10/187,061, (dated Nov. 1, 2007),11 pages.
"Final Office Action", U.S. Appl. No. 10/209,831, (dated Nov. 9, 2005),14 pages.
"Final Office Action", U.S. Appl. No. 11/086,590, (dated Mar. 18, 2009),15 pages.
"Final Office Action", U.S. Appl. No. 11/086,590, (dated Apr. 8, 2008),13 pages.
"Final Office Action", U.S. Appl. No. 11/086,590, (dated Dec. 18, 2007),13 pages.
"Final Office Action", U.S. Appl. No. 10/003,750, (dated Feb. 8, 2006),17 pages.
"Final Office Action", U.S. Appl. No. 10/003,750, (dated Nov. 16, 2007),19 pages.
"Final Office Action", U.S. Appl. No. 10/003,750, (dated Dec. 12, 2006),17 pages.
"Final Office Action", U.S. Appl. No. 10/017,680, (dated Jul. 15, 2005),15 pages.
"Final Office Action", U.S. Appl. No. 10/017,680, (dated Aug. 13, 2007),19 pages.
"Final Office Action", U.S. Appl. No. 10/033,177, (dated Jan. 4, 2005), 8 pages.
"Final Office Action", U.S. Appl. No. 10/033,177, (dated Mar. 13, 2006),13 pages.
"Final Office Action", U.S. Appl. No. 10/186,881, (dated Sep. 5, 2007), 32 pages.
"Final Office Action", U.S. Appl. No. 10/186,881, (dated Oct. 6, 2006),17 pages.
"Final Office Action", U.S. Appl. No. 10/187,057, (dated Jun. 23, 2005),10 pages.
"Final Office Action", U.S. Appl. No. 10/187,057, (dated Jul. 21, 2006),13 pages.
"Final Office Action", U.S. Appl. No. 10/187,063, (dated Jul. 19, 2006), 9 pages.
"Final Office Action", U.S. Appl. No. 10/187,190, (dated Jul. 21, 2006),21 pages.
"Final Office Action", U.S. Appl. No. 10/187,196, (dated Nov. 3, 2005),14 pages.
"Final Office Action", U.S. Appl. No. 10/187,210, (dated Jul. 12, 2005),14 pages.
"Final Office Action", U.S. Appl. No. 10/187,210, (dated Aug. 29, 2006),11 pages.
"Final Office Action", U.S. Appl. No. 10/187,216, (dated Oct. 3, 2005),11 pages.
"Final Office Action", U.S. Appl. No. 10/213,525, (dated Mar. 6, 2006),14 pages.
"Final Office Action", U.S. Appl. No. 10/213,525, (dated May 2, 2007),13 pages.
"Final Office Action", U.S. Appl. No. 10/213,525, (dated Jun. 17, 2008),15 pages.
"Final Office Action", U.S. Appl. No. 10/243,310, (dated Jun. 28, 2005),14 pages.
"Final Office Action", U.S. Appl. No. 10/243,310, (dated Jul. 7, 2006),15 pages.
"Final Office Action", U.S. Appl. No. 11/347,448, (dated Jun. 10, 2010),19 pages.
"Foreign Office Action", Hungarian Application No. P0301952, (dated Apr. 7, 2011), 3 pages.
"Foreign Office Action", Indonesian Application No. P00200300319, (dated May 5, 2011).
"International Search Report", Application No. PCT/US02/08061, (dated Aug. 22, 2002).
"Non Final Office Action", U.S. Appl. No. 10/003,753, (dated Jan. 12, 2006), 6 pages.
"Non Final Office Action", U.S. Appl. No. 10/003,767, (dated Jan. 25, 2006), 20 pages.
"Non Final Office Action", U.S. Appl. No. 10/003,767, (dated Sep. 26, 2006), 25 pages.
"Non Final Office Action", U.S. Appl. No. 10/003,767, (dated Sep. 26, 2005),18 pages.
"Non Final Office Action", U.S. Appl. No. 10/021,264, (dated Mar. 21, 2005),12 pages.
"Non Final Office Action", U.S. Appl. No. 10/021,264, (dated Jun. 13, 2006),10 pages.
"Non Final Office Action", U.S. Appl. No. 10/021,264, (dated Oct. 12, 2006), 20 pages.
"Non Final Office Action", U.S. Appl. No. 10/021,291, (dated Mar. 10, 2004), 8 pages.
"Non Final Office Action", U.S. Appl. No. 10/021,291, (dated Sep. 5, 2006),15 pages.
"Non Final Office Action", U.S. Appl. No. 10/021,316, (dated May 10, 2004), 6 pages.
"Non Final Office Action", U.S. Appl. No. 10/021,316, (dated Jun. 27, 2005), 9 pages.
"Non Final Office Action", U.S. Appl. No. 10/021,316, (dated Aug. 24, 2006),10 pages.
"Non Final Office Action", U.S. Appl. No. 10/021,563, (dated Jul. 8, 2004), 22 pages.
"Non Final Office Action", U.S. Appl. No. 10/021,563, (dated Dec. 3, 2003),10 pages.
"Non Final Office Action", U.S. Appl. No. 10/021,563, (dated Dec. 29, 2005), 25 pages.
"Non Final Office Action", U.S. Appl. No. 10/062,045, (dated Mar. 25, 2005),12 pages.
"Non Final Office Action", U.S. Appl. No. 10/177,470, (dated May 21, 2004), 6 pages.
"Non Final Office Action", U.S. Appl. No. 10/187,061, (dated Apr. 14, 2008),16 pages.
"Non Final Office Action", U.S. Appl. No. 10/187,061, (dated May 18, 2007),15 pages.
"Non Final Office Action", U.S. Appl. No. 10/187,061, (dated Sep. 7, 2005),10 pages.
"Non Final Office Action", U.S. Appl. No. 10/209,831, (dated Mar. 2, 2005),10 pages.
"Non Final Office Action", U.S. Appl. No. 10/209,831, (dated Apr. 12, 2007),17 pages.
"Non Final Office Action", U.S. Appl. No. 10/209,831, (dated Jun. 13, 2006),13 pages.
"Non Final Office Action", U.S. Appl. No. 10/243,310, (dated Feb. 1, 2006),13 pages.
"Non Final Office Action", U.S. Appl. No. 11/086,590, (dated Oct. 14, 2008),12 pages.
"Non Final Office Action", U.S. Appl. No. 10/003,753, (dated Jul. 8, 2004),29 pages.
"Non Final Office Action", U.S. Appl. No. 10/003,754, (dated Jan. 31, 2005), 7 pages.
"Non Final Office Action", U.S. Appl. No. 10/017,680, (dated Jan. 27, 2005),12 pages.
"Non Final Office Action", U.S. Appl. No. 10/017,680, (dated Apr. 6, 2006),15 pages.
"Non Final Office Action", U.S. Appl. No. 10/033,177, (dated May 10, 2004), 8 pages.
"Non Final Office Action", U.S. Appl. No. 10/033,177, (dated Jul. 22, 2005),11 pages.
"Non Final Office Action", U.S. Appl. No. 10/033.177, (dated Aug. 26, 2003), 6 pages.
"Non Final Office Action", U.S. Appl. No. 10/099,467, (dated Apr. 7, 2005), 7 pages.
"Non Final Office Action", U.S. Appl. No. 10/186,881, (dated Jan. 23, 2008), 42 pages.
"Non Final Office Action", U.S. Appl. No. 10/187,057, (dated Jan. 12, 2005), 8 pages.

(56) References Cited

OTHER PUBLICATIONS

"Non Final Office Action", U.S. Appl. No. 10/187,057, (dated Jan. 25, 2006),12 pages.
"Non Final Office Action", U.S. Appl. No. 10/187,057, (dated Nov. 15, 2006), 7 pages.
"Non Final Office Action", U.S. Appl. No. 10/187,063, (dated Jul. 18, 2005), 7 pages.
"Non Final Office Action", U.S. Appl. No. 10/187,063, (dated Dec. 7, 2006), 8 pages.
"Non Final Office Action", U.S. Appl. No. 10/187,190, (dated Feb. 2, 2006),12 pages.
"Non Final Office Action", U.S. Appl. No. 10/187,190, (dated Apr. 8, 2005),13 pages.
"Non Final Office Action", U.S. Appl. No. 10/187,190. (dated Nov. 3, 2004), 9 pages.
"Non Final Office Action", U.S. Appl. No. 10/187,190, (dated Nov. 13, 2006),12 pages.
"Non Final Office Action", U.S. Appl. No. 10/187,196, (dated Apr. 5, 2005), 9 pages.
"Non Final Office Action", U.S. Appl. No. 10/187,196, (dated Jul. 14, 2006),14 pages.
"Non Final Office Action", U.S. Appl. No. 10/187,216, (dated Feb. 9, 2007), 8 pages.
"Non Final Office Action", U.S. Appl. No. 10/187,216, (dated Apr. 26, 2005), 8 pages.
"Non Final Office Action", U.S. Appl. No. 10/187,216, (dated Jul. 28, 2006),11 pages.
"Non Final Office Action", U.S. Appl. No. 10/187,216, (dated Aug. 7, 2006),12 pages.
"Non Final Office Action", U.S. Appl. No. 10/213,525, (dated Aug. 24, 2005),11 pages.
"Non Final Office Action", U.S. Appl. No. 10/213,525, (dated Nov. 13, 2006),16 pages.
"Non Final Office Action", U.S. Appl. No. 10/213,525, (dated Nov. 19, 2007),16 pages.
"Non Final Office Action", U.S. Appl. No. 10/243,310, (dated Mar. 7, 2005),12 pages.
"Non Final Office Action", U.S. Appl. No. 10/243,310, (dated Dec. 22, 2006),17 pages.
"Non Final Office Action", U.S. Appl. No. 11/086,590, (dated Jul. 17, 2007),12 pages.
"Non Final Office Action", U.S. Appl. No. 11/203,482, (dated Oct. 19, 2007), 8 pages.
"Non Final Office Action", U.S. Appl. No. 11/203,484, (dated Sep. 23, 2008),7 pages.
"Non Final Office Action", U.S. Appl. No. 11/203,485, (dated Sep. 29, 2008),12 pages.
"Non Final Office Action", U.S. Appl. No. 11/203,490, (dated Sep. 26, 2008), 9 pages.
"Non Final Office Action", U.S. Appl. No. 11/276,655, (dated Apr. 3, 2009), 5 pages.
"Non Final Office Action", U.S. Appl. No. 11/347,448, (dated Apr. 14, 2011), 20 pages.
"Non Final Office Action", U.S. Appl. No. 11/347,448, (dated Aug. 20, 2009),19 pages.
"Non-Final Office Action", U.S. Appl. No. 10/003,750, (dated Jun. 6, 2007),13 pages.
"Non-Final Office Action", U.S. Appl. No. 10/003,750, (dated Jun. 27, 2006),17 pages.
"Non-Final Office Action", U.S. Appl. No. 10/003,750, (dated Sep. 15, 2005),16 pages.
"Non-Final Office Action", U.S. Appl. No. 10/099,577, (dated May 21, 2004),11 pages.
"Non-Final Office Action", U.S. Appl. No. 10/186,881, (dated Mar. 7, 2007), 26 pages.
"Non-Final Office Action", U.S. Appl. No. 10/186,881, (dated Mar. 24, 2006),15 pages.
"Non-Final Office Action", U.S. Appl. No. 10/186,881, (dated Sep. 8, 2005),19 pages.
"Non-Final Office Action", U.S. Appl. No. 10/187,210, (dated Feb. 8, 2005), 9 pages.
"Non-Final Office Action", U.S. Appl. No. 10/187,210, (dated Feb. 8, 2006),10 pages.
"Non-Final Office Action", U.S. Appl. No. 10/187,210, (dated Mar. 6, 2007), 6 pages.
"Non-Final Office Action", U.S. Appl. No. 10/187,210, (dated Nov. 15, 2006), 5 pages.
"Notice of Allowance & Examiner's Amendment", U.S. Appl. No. 10/177,470, (dated Aug. 6, 2004), 6 pages.
"Notice of Allowance & Examiner's Amendment", U.S. Appl. No. 10/017,680, (dated Oct. 10, 2007), 8 pages.
"Notice of Allowance & Examiner's Amendment", U.S. Appl. No. 10/017,680, (dated Aug. 13, 2007),10 pages.
"Notice of Allowance & Examiner's Amendment", U.S. Appl. No. 10/187,190, (dated Apr. 5, 2007), 7 pages.
"Notice of Allowance & Examiner's Amendment", U.S. Appl. No. 10/099,467, (dated Aug. 15, 2005), 6 pages.
"Notice of Allowance & Examiner's Amendment", U.S. Appl. No. 11/203,485, (dated Jun. 19, 2009),14 pages.
"Notice of Allowance & Examiner's Amendment", U.S. Appl. No. 11/203,490, (dated Jun. 22, 2009),11 pages.
"Notice of Allowance & Examiner's Amendment", U.S. Appl. No. 11/203,484, (dated Jun. 19, 2009),12 pages.
"Notice of Allowance & Examiner's Amendment", U.S. Appl. No. 10/186,881, (dated Jul. 29, 2008),10 pages.
"Notice of Allowance and Examiner's Amendment", U.S. Appl. No. 10/062,045, (dated Dec. 16, 2005), 7 pages.
"Notice of Allowance", U.S. Appl. No. 10/003,767, (dated Jun. 14, 2007), 6 pages.
"Notice of Allowance", U.S. Appl. No. 10/003,753, (dated Jun. 30, 2006), 6 pages.
"Notice of Allowance", U.S. Appl. No. 10/003,754, (dated Jul. 12, 2005), 5 pages.
"Notice of Allowance", U.S. Appl. No. 10/099,467, (dated Jun. 6, 2005), 4 pages.
"Notice of Allowance", U.S. Appl. No. 10/099,577, (dated Aug. 6, 2004), 4 pages.
"Notice of Allowance", U.S. Appl. No. 10/187,210, (dated Jul. 9, 2007), 4 pages.
"Notice of Allowance", U.S. Appl. No. 10/968,731, (dated Mar. 10, 2006), 6 pages.
"Notice of Allowance", U.S. Appl. No. 11/203,482, (dated Feb. 29, 2009), 7 pages.
"Notice of Allowance", U.S. Appl. No. 11/203,482, (dated Apr. 11, 2008), 6 pages.
"Notice of Allowance", U.S. Appl. No. 11/276,655, (dated Sep. 25, 2009), 7 pages.
"Restriction Requirement", U.S. Appl. No. 10/017,680, (dated Nov. 4, 2004), 5 pages.
"Restriction Requirement", U.S. Appl. No. 10/099,467, (dated Dec. 27, 2004), 5 pages.
"Restriction Requirement", U.S. Appl. No. 10/187,196, (dated Jan. 11, 2005), 5 pages.
"Restriction Requirement", U.S. Appl. No. 10/187,216, (dated Jan. 26, 2005), 5 pages.
"Restriction Requirement", U.S. Appl. No. 10/213,525, (dated Jun. 21, 2005), 5 pages.
"SAFFLINK'S JotterSAF E-Wallet & Privacy Software", *PR Newswire*, Now available for Consumer Download, (Feb. 7, 2001), 3 pages.
"ScanSoft's New OmniForm Premium 5.0 to Offer Business Powerful Forms Management, Software Converts Paper Forms to Digital for Easy Distribution and Accurate Data Management", *M2 Presswire, Scansoft*, (Oct. 1, 2001), 2 pages.
"ScanSoft's New OmniForm Premium 5.0 to Offer Business Powerful Forms Management", *PR Newswire*, (Oct. 1, 2001), 4 pages.
"SOAP Version 1.2 Part 1: Messaging Framework", http://www.w3.org/TR/2001/WD-soap12-part1-20011002, (Oct. 2, 2001), 33 pages.
"SOAP Version 1.2 Part 2: Adjuncts", http://www.w3.org/TR/2001/WD-soap12-part2-20011002, (Oct. 2, 2001), 45 pages.
"X Marks the Path", *JNJ Online:*, (Jan. 3, 2002), 6 pages.

(56) References Cited

OTHER PUBLICATIONS

"XML Path Language (XPath)", http://www.w3.org/TR/1999/REC-xpath-19991116, (Nov. 16, 1999), 33 pages.
Ayers, Bill "XML for Recourse Scheduling / Calendar Management", xml-dev_list.posting, downloaded from lists.xml.org/archives/xml-dev/199811/msg00165.html, (Nov. 8, 1998), 2 pages.
Barish, Greg "Untangling the Web", Intelligent Enterprise, (Mar. 27, 2001),1 page.
Bergman, Ruth "XML Technology Enables Redesigned Deep Space Network Operations", IEEE (Mar. 2000), pp. 493-502.
Box, Don et al., "Simple Object Access Protocol (SOAP) 1.1", W3C Note, retrieved from <<http://www.w3.org/TR/2000/NOTE-SOAP-20000508/>> on Apr. 8, 2011,(May 8, 2000), 33 pages.
Carroll, Ted et al., "XML for Resource Scheduling / Calendar Management", xml-dev list posting, downloaded from: lists.xml.org/archives/xml-dev/199811/msg00151.html, (Nov. 6, 1998), 2 pages.
Caswell, Deborah "An Evolution of DCE Authorization Services", Hewlett-Packard Journal, vol. 46, No. 6, (Dec. 1995), pp. 49-54.
Chandramouli, Ramaswamy "Application of XML Tools for Enterprise-Wide RBAC Implementation Tasks", ACM Press, (2000), 8 pages.
Chris, Dix "Working with Soap, The Simple Object Access Protocol", C/C++ Users Journal vol. 19, No. 1, Jan. 2001, (14 pages), Jan. 2001.
Chu, S. et al., "Web-Based Single Sign-On Solutions: An SSO Product Matrix", Computer Security Journal, CSI Computer Security Institute, XX, vol. 16 No. 1, XP008021056, ISSN: 0277-0865,(Nov. 2000), pp. 39-49.
Cook, Dave "The Win2000 Active Directory", Issue 119, (Jun. 2000), pp. 3-6.
Eustice, K F., et al., "A Universal Information Appliance", IBM Systems Journal, vol. 38 No. 4, (1999), pp. 575-601.
Farjami, Peymon et al., "Advance Service Provisioning Based on Mobile Agents", Computer Communications, (Apr. 2000),11 pages.
Ferreira, Joao et al., "Using LDAP in a Filtering Service for Digital Library", (1997), pp. 1-5.
Freire, Juliana et al., "WebViews: Accessing Personalized Web Content and Services", ACM 2001, (2001), pp. 576-586.
Gates, Bill "Hailstorm Announcement", Bill Gates Speech, www.microsoft.com/billgates/2001/03-19hailstorm.asp, (Mar. 19, 2001), 27 pages.
Jerbic, Mike "Security Requirements for Web-Services", Position Papers for World Wide Web Consortium (W3C) Workshop on Web Services, Hewlett-Packard Lab, Bristol UK, (2001), pp. 28-33.
Koppen, Eckhart et al., "Active Hypertext for Distributed Web Appliances", Proceedings of the Eighth IEEE International Workshops on Enabling Technologies: Infrastructure for Collaborative Enterprises (WET-ICE '99), (Jun. 1999), pp. 297-302.
Kormann, David P., et al., "Risks of the Passport Single Signon Protocol", 2000 Computer Networks, Elsevier Science Publishers B.V., Amsterdam, NL, vol. 33, (2000), pp. 51-58.
U.S. Appl. No. 60/275,809, filed Mar. 14, 2001, 381 pages.
Roussev, Vassil et al., "Integrating XML and Object-based Programming for Distributed Collaboration", IEEE 9th International Workshops, (Jun. 2000), 6 pages.
Stallings, William "Cryptography and Network Security", Prentice Hall, Inc. 1998, Chapter 11, (1998), 7 pages.
Vuong, Nathan N., et al., "Managing Security Policies in a Distributed Environment Using eXtensible Markup Language (XML)", ACM Symposium on Applied Computing—SAC, Retrieved from http://users.cis.fiu.edu/~smithg/papers/sac01.pdf, (2001), 7 pages.
"Foreign Notice of Allowance", EP Application No. 02725195.8, (dated Aug. 12, 2011),6 pages.
"Foreign Office Action", EP Application No. 02707934.2, (dated Jan. 23, 2007),4 pages.
"Foreign Office Action", EP Application No. 02709753.4, (dated May 9, 2008),5 pages.
"Foreign Office Action", EP Application No. 02719261.6, (dated May 2, 2008),5 pages.
"Foreign Office Action", EP Application No. 02721433.7, (dated Aug. 23, 2011),7 pages.
"Foreign Office Action", EP Application No. 02721433.7, (dated Oct. 16, 2009),5 pages.
"Foreign Office Action", EP Application No. 02725195.8, (dated Oct. 30, 2009),5 pages.
"Getting Results with Microsoft Office 97", Microsoft, (1997),pp. 28-31, 345-374 & 470-471.
"International Search Report", Application No. PCT/US02/06244, (dated Oct. 2, 2002),3 pages.
"International Search Report", Application No. PCT/0s02/06243, (dated May 7, 2002),1 page.
"International Search Report", Application No. PCT/US02/06245, (dated May 30, 2002),2 pages.
"International Search Report", Application No. PCT/US02/06329, (dated Sep. 19, 2002),4 pages.
"International Search Report", Application No. PCT/US02/07953, (dated Jun. 10, 2002),1 page.
"International Search Report", Application No. PCT/US02/08061, (dated Aug. 22, 2002),3 pages.
"International Search Report", Application No. PCT/US02/08063, (dated May 30, 2002),3 pages.
"Supplementary EP Search Report", EP Application No. 02709743.5, (dated Sep. 5, 2006),3 pages.
"Supplementary EP Search Report", EP Application No. 02721433.7, (dated Aug. 13, 2009),3 pages.
"Supplementary EP Search Report", European Application No. 02728381.1, (dated Feb. 5, 2007),3 pages.
"Supplementary European Search Report", EP Application No. 02707934.2, (dated May 30, 2006),3 pages.
"Supplementary European Search Report", EP Application No. 02719261.6, (dated Feb. 5, 2007),5 pages.
"Supplementary European Search Report", EP Application No. 02725195.8, (dated Aug. 4, 2009),4 pages.
"Supplementary European Search Report", European Application No. 02709753.4, (dated Feb. 13, 2007),3 pages.
Imamura, et al., "Metadata Representation in XML for Internet-Based Electronic Application from Business to Government", IEEE, (Jul. 2000), pp. 387-392.
Jepsen, Tom "Soap Cleans up Interoperability Problems on the Web", IT Professional vol. 3, Issue 1, (Feb. 2001),pp. 52-55.
Jingyu, et al., "Object-Oriented Representation for XML Data", IEEE, (Apr. 2001),pp. 40-49.
Lowry, P. B., "XML Data Mediation and Collaboration: A Proposed Comprehensive Architecture and Query Requirements for Using XML to Mediate Heterogeneous Data Sources and Targets", System Sciences, 2001. Proceedings of the 34th Annual Hawaii International Conference, (Jan. 3, 2001),pp. 2535-2543.
Magendanz, T "TINA—Architectural Basis for Future Telecommunications Services", Computer Communications, (Jun. 1996),pp. 233-245.
Morrison, Michael et al., "XML Unleashed", Sam's Publishing, Indianapolis, IN (Dec. 1999),pp. 26-37, 84-104 & 106-122.
Padwick, Gordon "Using Microsoft Outlook 2000, Special Edition", Que Corporation, Indianapolis, IN, (May 1999),pp. 370-376, 382-386 & 392-396.
Phelps, Thomas A., et al., "Multivalent Documents: A New Model for Digital Documents", Division of Computer Science, UC Berkeley, Available at <https://www.eecs.berkeley.edu/Pubs/TechRpts/1998/CSD-98-999.pdf>,(1998),pp. 1-44.
Reinwald, B et al., "Heterogeneous Query Processing Through SQL Table Functions", Data Engineering, 1999. Proceedings 15th International Conference on Sydney, NSW Austrailia, (Mar. 1999),pp. 366-373.
Reinwald, Berthold et al., "Heterogeneous Query Processing Through SQL Table Functions", Data Engineering, 1999. Proceedings 15th International Conference on Sydney, NSW Austrailia, (Mar. 1999),8 pages.
Spears, Margery et al., "Microsoft Outlook 2000", Step by Step, Catapult Inc., (1999),pp. vii-ix, 133-218 & 221-267.
Spencer, et al., "Installing and Configuring Active Directory", Prentice Hall PTR, (May 2000),pp. 1-13.

(56) References Cited

OTHER PUBLICATIONS

Stamoulis, G D., et al., "Efficient Agent-Based Negotiation for Telecommunications Services", *Institute of Computer Science (ICS) Foundation for Research and Technology*, (Dec. 5, 1999),8 pages.
Wong, Hao He "A Role-Based Access Control Model for XML Repositories", *Proceedings of the First International Conference on Web Information Systems Engineering*, (Jun. 2000),pp. 138-145.
"Final Office Action", U.S. Appl. No. 11/347,448, (dated Nov. 7, 2011),21 pages.
"Foreign Notice of Allowance", Canadian Application No. 2428481, (dated Apr. 5, 2011),1 page.
Li, et al., "What You See is What I Saw: Applications of Stateless Client Systems in Asynchronous CSCW", In Proceeding of the Fourth International Conference on Computer Science and Informatics, 1998, 5 pages.
Ochi, et al., "Network Applications for Mobile Computing", Fujitsu Sci. Tech. J., 34, 1, Sep. 1998, pp. 41-49.
"Examination Report", Turkish Application No. 2003/00769, (dated Jun. 13, 2007), 4 pages.
"Examination Report", Turkish Application No. 2003/00769, (dated Oct. 15, 2008), 5 pages.
"Examiners Report", AU Application No. 2003204123, (dated Oct. 27, 2008), 2 pages.
"Examiners Report", CA Application No. 2,428,481, (dated Apr. 2, 2009), 3 pages.
"Examiners Report", MY Application No. PI20031685, (dated Jul. 20, 2007), 3 pages.
"Foreign Office Action", CN Application No. 03145733.9, (dated Aug. 22, 2008),14 pages.
"Foreign Office Action", CN Application No. 03145733.9, (dated Nov. 2, 2007),12 pages.
"Foreign Office Action", CN Application No. 03145733.9, (dated Dec. 30, 2005), 7 pages.
"Foreign Office Action", EP Application No. 02709743.5, (dated Apr. 21, 2009), 5 pages.
"Foreign Office Action", EP Application No. 02709743.5, (dated Jun. 13, 2007), 5 pages.
"Foreign Office Action", Indonesian Application No. P-00200300319, (dated Mar. 3, 2006), 4 pages.
"Foreign Office Action", JP Application No. 2003-164094, (dated Mar. 17, 2009), 6 pages.
"Foreign Office Action", JP Application No. 2003-164094, (dated May 23, 2008), 6 pages.
"Foreign Office Action", JP Application No. 2003-164094, (dated Sep. 18, 2009), 4 pages.
"Foreign Office Action", KR Application No. 10-2003-42575, (dated May 29, 2009), 7 pages.
"Foreign Office Action", Norwegian Application No. 20032997, (dated Sep. 28, 2009), 3 pages.
"Foreign Office Action", Norwegian Application No. 20032997, (dated Dec. 23, 2008), 6 pages.
"Foreign Office Action", PL Application No. 360329/DP, (dated Feb. 23, 2010), 2 pages.
"Foreign Office Action", PL Application No. 360329/DP, (dated Aug. 31, 2009), 5 pages.
"Foreign Office Action", RU Application No. 2003119524, (dated Aug. 15, 2007), 9 pages.
"Notice of Allowance", U.S. Appl. No. 11/347,448, (dated Apr. 29, 2013),14 pages.
"Search Report", HU Application No. P0301952, (dated Mar. 30, 2005),1 page.
"Secure Socket Layer (SSL)", Retrieved at.<<<http://pic.dhe.ibm.com/infocenter/wasinfo/v7r0/index.jsp?topic=%2Fcom.ibm.websphere.edge.doc%2Fcp%2Fadmingd35.htm>>, (Jan. 31, 2001),6 pages.
"Summons to Attend Oral Proceedings", EP Application No. 03009717.4, (Oct. 18, 2006), 6 pages.
Cohen, Edith et al., "Improving End-to-End Performance of the Web Using Server Volumes and Proxy Filters", *ACM*, 1998, Retrieved at <<http://delivery.acm.org/10.1145/290000/285286/p241-cohen.pdf>>, (1998),13 pages.
Ding, Chen et al., "Selective Java Applet Filtering on Internet", *IEEE*, 1999, Retrieved at <<http://ieeexplore.ieee.org/stamp/stamp.jsp?tp=&arnumber=825217>>, 5 pages.
Faensen, D et al., "Hermes—A Notification Service for Digital Libraries", *Proceedings of the ACM/IEEE Joint Conference on Digital Libraries*, (Jun. 24, 2001), 8 pages.
Huang, Yongqiang et al., "Publish/Subscribe in a Mobile Environment", *Proceedings of the Second ACM International Workshop on Data Engineering for Wireless and Mobile Access* (May 20, 2001), 8 pages.
Miller, Gene et al., "News On-Demand for Multimedia Networks", *Proceedings of the First ACM International Conference on Multimedia*, (Aug. 1, 1993),11 pages.
Wang, Yi-Min et al., "The SIMBA User Alert Service Architecture for Dependable Alert Delivery", *Proceedings of the International Conference on Dependable Systems and Networks*, (Mar. 26, 2001), 11 pages.
"Notice of Allowance", U.S. Appl. No. 11/347,448, (dated Jun. 25, 2013),10 pages.
Forte, Marcos et al., "A content classification and filtering server for the Internet", (Apr. 2006), 6 pages.
Mazouni, Karim R., et al., "Filtering Duplicated Invocations Using Symmetric Proxies", (1995), pp. 118-126.
Wu, Shyhtsun F., "Sleepy Security Management with Proxy-Based Filtering", (Apr. 1, 1996), 8 pages.
"Examination Report", New Zealand Application No. 525694, (dated May 13, 2003), 2 pages.
"Non-Final Office Action", U.S. Appl. No. 11/347,448, (dated Dec. 20, 2012), 23 pages.
"Search Report", Danish Application No. 2003027299, (dated Mar. 15, 2004), 1 page.
"Foreign Office Action", BR Application No. PI0302014-2, dated Dec. 3, 2015, 2 pages.
"Notice of Allowance", U.S. Appl. No. 14/045,704, dated Jan. 8, 2016, 8 pages.
Datta,"Proxy-Based Acceleration of Dynamically Generated Content on the World Wide Web: An Approach and Implementation", ACM—Retrieved at: http://delivery.acm.org/10.1145/570000/564703/p97-datta.pdf, Jun. 2002, 12 pages.
Haviland,"Designing High-Performance Campus Intranets with Multilayer Switching", Cisco Systems White Paper—Retrieved at: http://ai3.itb.ac.id/~basuki/private/ITFORUM/BACKBONE/NETWOR~/HIGH-P~1.PDF, 1998, 33 pages.
Menon,"Object Replacement using Dynamic Proxy Updates", Retrieved at: http://ieeexplore.org/stamp.jsp?tp=&arnumber=289933, Mar. 1994, 10 pages.
"Final Office Action", U.S. Appl. No. 14/045,704, dated Apr. 16, 2015, 26 pages.
"Foreign Office Action", BR Application No. PI0302014-2, dated May 18, 2015, 11 pages.
Tannenbaum,"Modern Operating Systems", 2nd Edition, Prentice Hall, 2001, 9 pages.
"Foreign Office Action", EP Application No. 02719261.6, dated Jun. 24, 2016, 5 pages.
"Notice of Allowance", U.S. Appl. No. 14/045,704, dated Apr. 1, 2016, 12 pages.
"Technology Primer: Secure Sockets Layer (SSL)", Retrieved at: <http://bluecoat.com/documents/download/0485e335-7437-4c4e-bfc0-ca5ffc5bfd4d/16f27cf7-5d59-44b4-b17f-fb04acea369f>, 2001, 22 pages.
Cabri,"Supporting cooperative WWW browsing: a proxy-based approach", <http://ieeexplore.ieee.org/stamp/stamp.jsp?tp=&arnumber=746657>, Feb. 1999, 8 pages.
Han,"Websplitter: A Unified XML Framework for Multi-Device Collaborative Web Browsing", ACM Conference on Computer Supported Cooperative Work, 2000, 10 pages.
"Foreign Office Action", IN Application No. 740/DEL/2003, dated Jan. 25, 2017, 7 pages.
"Non-Final Office Action", U.S. Appl. No. 14/045,704, dated Nov. 21, 2014, 25 pages.

(56) References Cited

OTHER PUBLICATIONS

Nielsen,"Web Services Routing Protocol (WS-Routing)", Oct. 23, 2001, 53 pages.

* cited by examiner

IDENTITY-BASED DISTRIBUTED COMPUTING FOR DEVICE RESOURCES

FIELD OF THE INVENTION

The invention relates generally to computer systems, and more particularly to computer resources.

BACKGROUND OF THE INVENTION

In early personal computing systems, application program had to be programmed with knowledge of various computing devices in order for the application to use such devices. For example, in order to print to a particular printer, a word processing program had to know how to print to the printer, and generally supplied a driver for each supported printer. Alternatively, a printer would supply drivers with it for the most popular programs. The user had to configure each program to inform that program as to which printer was connected to the personal computer.

Contemporary operating systems such as Microsoft Windows® provided developers with a way to interface applications with such devices regardless of the specific device driver needs and requirements. For example, with the Microsoft Windows® operating system a user or the device tells the operating system which printer (or printers) is connected, after which any application is able to communicate with the printer driver via the operating system. As a result, to accomplish printing, application programs generally only need to deal with a set of standardized printing functions provided by the operating system. The enormous benefits of such an abstraction cannot be understated, e.g., this abstraction enables any one of thousands of software programs to interact with any one of thousands of printers and/or other devices, without the program having to know (or otherwise supply) the details about the printer in advance.

Microsoft Corporation's .NET technology provides a somewhat similar type of abstraction regarding a user's or company's data. In general, with .NET technology, any .NET-capable program on any device can interact with a user's data via centralized schema-based services. Because of the schematization, the programs do not need specific knowledge about the details of that data, e.g., which used to be stored in proprietary file formats, but rather only needs to be able to deal with (read and write) data formatted according to one or more of the schemas.

With .NET technology, a user's (or other entity's) identity controls access to the centrally-maintained data, e.g., a user may use a .NET Inbox service keep his or her electronic mail data centrally stored (e.g., on the Internet or an intranet), and then access that data via the .NET inbox service, at any time, from any device capable of connecting to the Internet or an intranet and having a program capable of interacting with the .NET Inbox service. The user's identity is used to securely match the user with the appropriate data. Users can also controllably allow access to data by other users, e.g., a user can selectively make certain business contact information available to business associates, make personal contact information available to friends, and so on, based on the others' identities.

While .NET thus provides tremendous data-based benefits to users, companies and other entities, the centralized service and centralized data are not particularly concerned with how a user uses various devices and those devices' resources. For example, devices such as a personal computer and pocket personal computer have, for quite some time, been able to directly synchronize with one another. To an extent, .NET technology is another way to keep such data synchronized, although indirectly, without needing specialized and proprietary synchronization programs.

However, even with .NET, a user cannot easily use one device to access the resources of another device, such as to use the computing power, storage, bandwidth, input and output mechanisms, programs and/or other resources of one device on behalf of another device, e.g., to perform a complex or better-suited task on the more powerful device. What is needed is a common, consistent way to remotely discover and expose computing resources of various computing devices to one another for cross-resource usage.

SUMMARY OF THE INVENTION

Briefly, the present invention provides a system and method for discovering and describing computing resources available at various computing devices associated with an identity, and for exposing those resources as services that are addressable by software programs, such that programs on the devices can leverage another device's resources. The device services are identity-based, in that a device owner's devices discover each other and/or other devices accessible by a user based on the owner's or other user's identity. Further, based on identity, a device owner (or administrator) can control what other users, and/or other devices can leverage the resources of each owned device, as well as to what extent.

Computing resources may include, for example, the storage capacity of the devices, bandwidth, processing power (e.g., the CPU and RAM capabilities), input mechanisms and methods, rendering and other output mechanisms and methods (e.g., screens, printers and audio), and programs. A device is thus abstracted into its resources, which are then programmatically addressable from other devices in a composible fashion (e.g., the remote resources may be defined in such a way that they are, in turn, comprised of smaller resources contained within the larger definition of the resource). In other words, for devices to participate in an intelligent distributed computing model, various aspects of each participating device are abstracted and made programmatically addressable from other devices. A unified identity-based mechanism discovers the list of remote resources on the device. A set of one or more schemas consistently describes the remote resources on the device, and a unified security model allows the owner of the device to control who has access to which resources, and to what extent.

With the present invention, desirable computing solutions for a great number of example scenarios are enabled, including a set of real-time scenarios in which one user device interacts with one or more remote computing devices in real-time, and a set of scheduled or predicted scenarios that operate transparently and automatically on a user's behalf.

Other advantages will become apparent from the following detailed description when taken in conjunction with the drawings, in which:

DETAILED DESCRIPTION

Exemplary Operating Environments

Figure 1A:
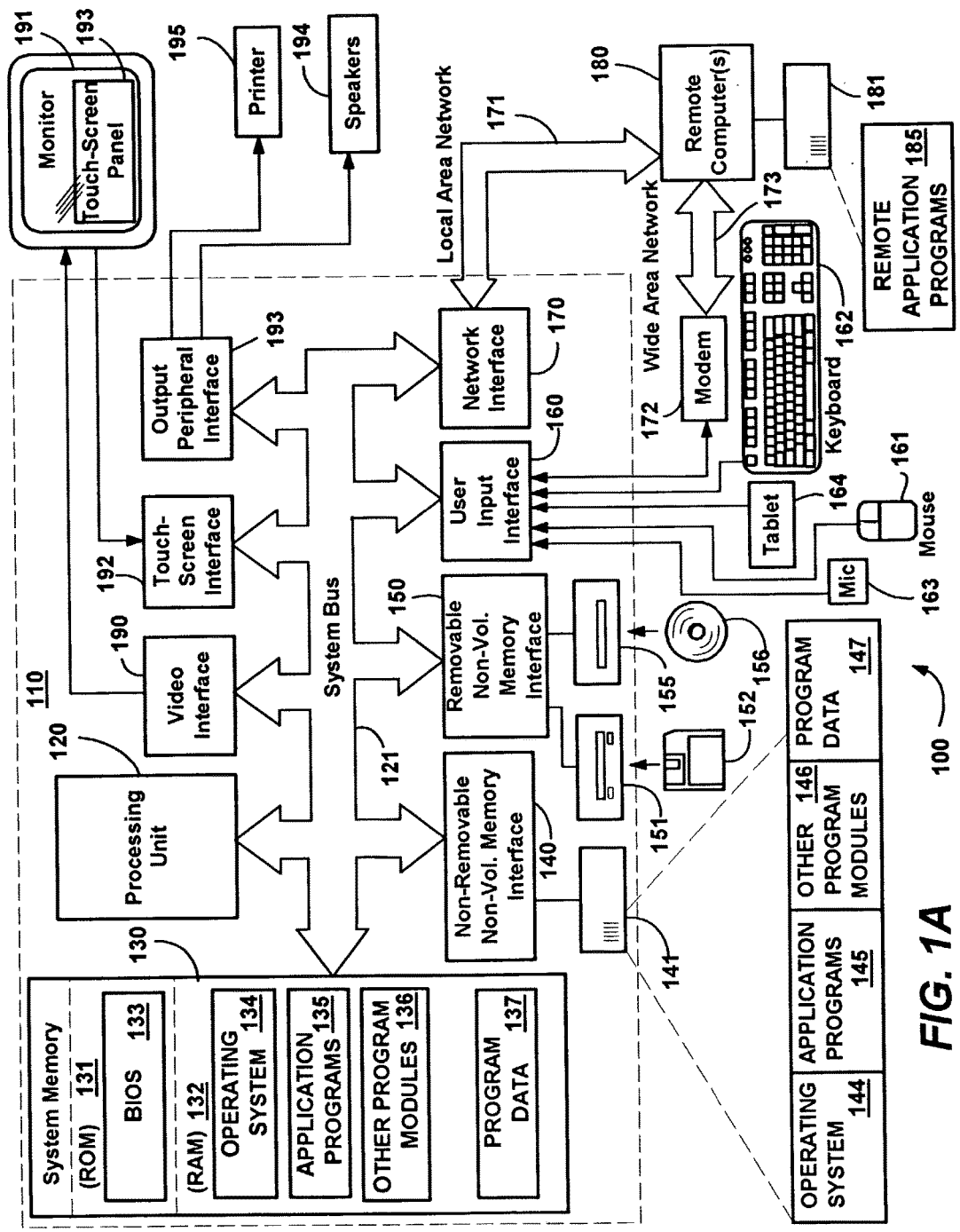
FIG. 1A is a block diagram generally representing a computer system into which the present invention may be incorporated.

FIG. 1A illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1A, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Note that any and all of the elements shown in computer 110 may be connected to each other by standard high-speed computer networks, including those distributed across a wide geographic area. For example, the system memory 130 may be located in a physically different location than processing unit 120, but yet defined in a composible fashion as logical computer 110.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136 and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1A, provide storage of computer-readable instructions, data structures, program modules and other data for the computer 110. In FIG. 1A, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet, or electronic digitizer, 164, a microphone 163, a keyboard 162 and pointing device 161, commonly referred to as mouse, trackball or touch pad. Other input devices not shown in FIG. 1A may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

Figure 1B:
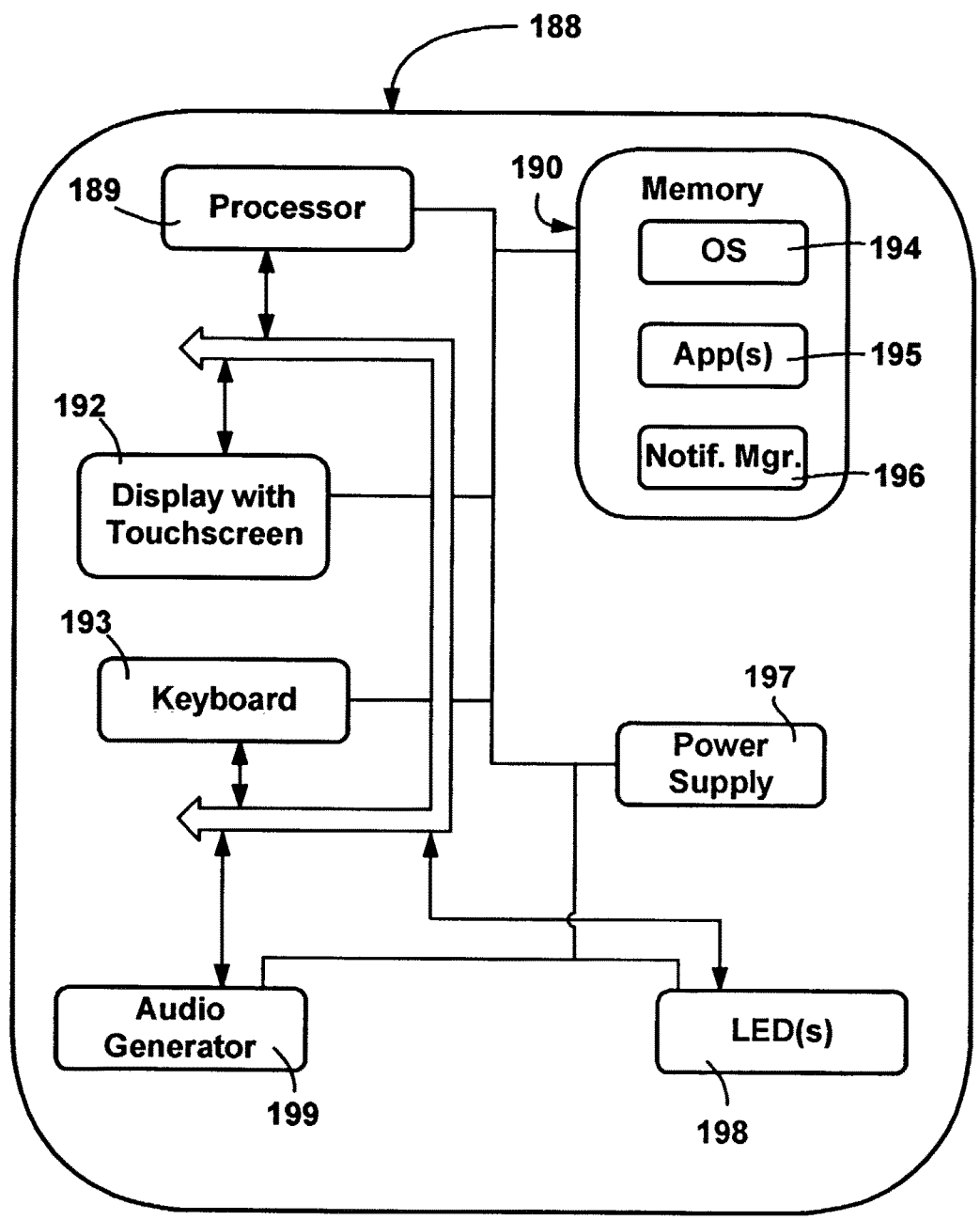
FIG. 1B is a block diagram generally representing another computer system into which the present invention may be incorporated.

FIG. 1B illustrates an example of another suitable operating environment (computer device 188) in which at least part of the present invention may be implemented. As with FIG. 1A, the operating environment of FIG. 1B is only one other example of a suitable operating environment and is not intended to suggest any limitation as to the scope of use or functionality of the invention. The other computer device 188 in FIG. 1B typically includes at least some form of computer readable media. Computer-readable media can be any available media (as generally defined above) that can be accessed by the computing device 188.

FIG. 1B shows functional components of a computing device 188 such as a handheld (pocket-sized or tablet) personal digital assistant, including a processor 189, a memory 190, a display 192, and a keyboard 193 (which may be a physical or virtual keyboard). The memory 190 generally includes both volatile memory (e.g., RAM) and non-volatile memory (e.g., ROM, PCMCIA cards, and so forth). An operating system 194 is resident in the memory 190 and executes on the processor 189, such as the Windows® CE operating system from Microsoft® Corporation, or another operating system.

One or more application programs 195 are loaded into memory 190 and run on the operating system 194. Examples of applications include email programs, scheduling programs, PIM (personal information management) programs, word processing programs, spreadsheet programs, Internet browser programs, and so forth. The handheld personal computer 188 may also include a notification manager 196 loaded in the memory 190, which executes on the processor 189. The notification manager 196 handles notification requests, e.g., from the application programs 195.

The handheld personal computer 188 has a power supply 197, which is implemented as one or more batteries. The power supply 197 may further include an external power source that overrides or recharges the built-in batteries, such as an AC adapter or a powered docking cradle.

The exemplary handheld personal computer 188 represented in FIG. 1B is shown with three types of external notification mechanisms: one or more light emitting diodes (LEDs) 198 and an audio generator 199. These devices may be directly coupled to the power supply 197 so that when activated, they remain on for a duration dictated by a notification mechanism even though the handheld personal computer processor 189 and other components might shut down to conserve battery power. The LED 198 preferably remains on indefinitely until the user takes action. Note that contemporary versions of the audio generator 199 use too much power for today's handheld personal computer batteries, and so it is configured to turn off when the rest of the system does or at some finite duration after activation.

Identity-Based Distributed Computing for Device Resourses

The present invention is generally directed to a system and method that facilitate the distribution of resources of devices to other devices. The present invention is ordinarily not involved with what the devices do with each other's resources, what is communicated at that time, or how the communication between devices takes place. Rather, the present invention can be generally considered more as a structured way for devices to find out about each other's resources, capabilities and other details, and then allow the devices to share resources on their own. Although not necessary to the present invention, as part of facilitating the resource distribution, security is provided for practical purposes, at least to ensure that valid credentials are required to use another device's resources. Thus, the present invention is preferably identity-based, in that distributed resources have relationships with one another according to identity data (e.g., credentials) provided to the devices.

In general, the present invention is directed to distributing computing among a user's devices, wherein a user (or owner/administrator) is anyone authorized to control and/or use the devices. However, because in general devices are increasingly becoming disaggregated, the methods and systems described herein may be more properly described as distributed computing of resources. For example, a single distributed device may be made up of many resources, but may share as little as one its resources (e.g., only its non-volatile storage) to participate as a resource provide. Notwithstanding, as used herein, the terms "device" and "resource" are generally interchangeable except where otherwise apparent, e.g., using another device or using a resource of the other device to accomplish some computing task are generally considered the same thing. Also, as used herein, bandwidth is a device resource, even though bandwidth may not ordinarily be considered as being associated with any particular device.

Figure 2:
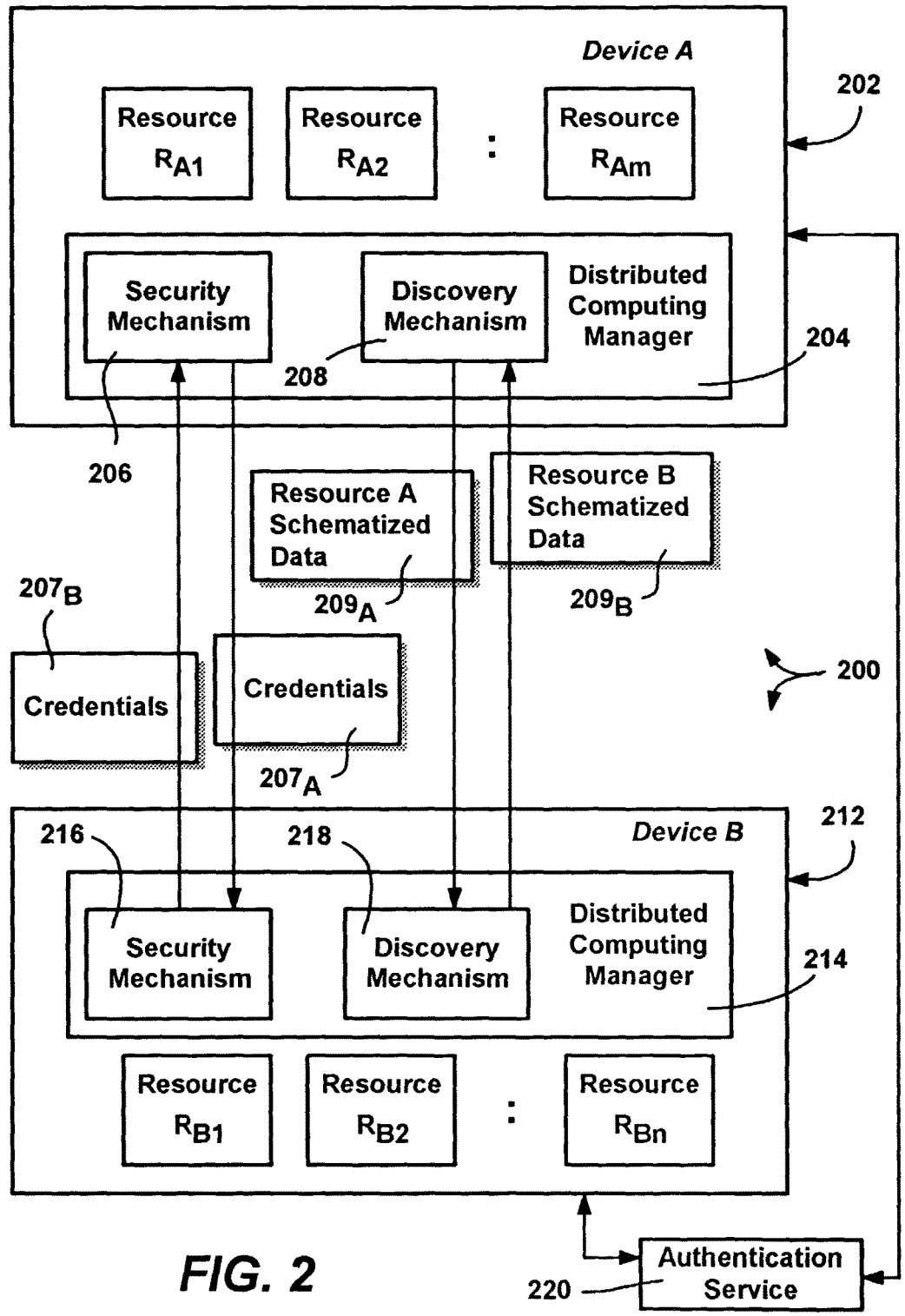
FIG. 2 is a block diagram representing various components in a distributed computing environment in accordance with an aspect of the present invention.

As generally represented in FIG. 2, a distributed computing environment 200 constructed in accordance with various aspects of the present invention includes a first device 202 (Device A, such as the computer system 110 of FIG. 1A) and a second device 212 (Device B, such as the computer system 188 of FIG. 1B), along with possibly other devices (not shown). Each device that participates in the distributed computing environment 200 includes a distributed computing manager, 204 and 214. In general, and as described below, the distributed computing managers 204 and 214 may comprise some amount of code that communicate with one another over some medium, e.g., wireless FM, line-of-sight such as infrared, satellite, a direct connection, the Internet, or an intranet. Indeed, more than one such medium may be available, and the distributed computing managers 204 and 214 may choose which one or ones are best for a given circumstance.

An initial purpose of the distributed computing managers 204 and 214 are to locate each other. Such location may be automatic, such as by having each device occasionally broadcast its availability to others and/or by polling for the availability of other devices, or alternatively may operate in response to some specific request from a program (or user) to connect to another device. As represented in FIG. 2, the distributed computing managers 204 and 214 each include a security mechanism 206 and 216, respectively, that exchange credentials 207, 217 or the like (e.g., obtained from an authentication service 220) to ensure that the user who is currently operating the device which is contacting it (and/or the device itself), is valid in the distributed computing environment, and similarly, if necessary, that the device which is being contacted is valid. Note that a program being used may also factor into the security/access control, e.g., a first program running on one device may have authority to use another device's resource or resources, but not another program, independent of or in addition to the user identity and/or the device identity. Further note that the security mechanism may operate per identity and per resource, e.g., one entity may be authorized to use a device's display, but not its storage, while another entity may be able to use any of that same device's available resources, including its storage. This is similar to the .NET security model in which services provide methods that control access to a users' data based on the requesting user's identity, defined role and scope for that role. In this way, data can be accessed by its owner, and shared to an extent determined by the owner. In the present invention, instead of data it is a device resource being accessed, whereby a user's identification, defined role and scope for that role determine the extent to which a resource may be accessed.

Indeed, the security mechanisms of the present invention are based on those essentially those employed for security/access control in .NET services, as generally described in U.S. patent applications, Ser. No. 10/003,754 entitled "IDENTITY-CENTRIC DATA ACCESS" and Ser. No. 10/003,767, entitled "AUTHORIZING A REQUESTING ENTITY TO OPERATE UPON DATA STRUCTURES" filed on Oct. 22, 2001, assigned to the assignee of the present application, and herein incorporated by reference. To this end, at least a thin subset of the .NET service runs on each device which expects to advertise and share computing resources in the environment 200. In addition, a localized internal consistent security model may be executed on these devices such that local security is provided even when two local peer-to-peer devices may be disconnected from the centralized (e.g., Passport) authentication service 220 (FIG. 2).

The present invention is not limited to any particular transmission medium, but provides that the distributed resource services may be directly addressable to the target device, or may be queried via the Internet or an intranet, such as via the centralized set of .NET services on the web. When connected via the Internet or intranet, a program may query the last known computing resources available on any device associated with the user's identity, even when the device is offline or otherwise inaccessible. Bandwidth is also a resource, and may impact how a device's resources are shared, e.g., it may be more efficient to leverage a personal computer's resources when the personal computer has a high-speed connection to the Internet, but not if the personal computer connects only at low speed, such as if the other device has a high-speed connection. In fact, the personal computer may want to leverage the high-speed connection of the other device, in which event that other device may then leverage a resource of the personal computer, e.g., the devices exchange resources to provide a more-optimal user experience.

In accordance with one aspect of the present invention, the distributed computing managers 204 and 214 also each include a respective discovery mechanism, 208 and 218, that allows the devices to discover another participating device's shared resources/capabilities, that is, when that other device is configured to share its resources. The respective resource data 209 and 219 is formatted (e.g., in XML) and exchanged in accordance with a defined schema, as described below. As represented in FIG. 2 by the exchange of the schematized data 209 and 219, both devices 202 and 204 are configured to share their resources ($R_{A1}$-$R_{Am}$ and $R_{B1}$-$R_{Bn}$) with other devices in the distributed computing environment. However as can be appreciated, in a given environment, a particular device (e.g., a mobile telephone) may be only a consumer of resources rather a provider of any resource, or conversely may be only a provider, and not a consumer.

A device that is sharing its resources need not directly communicate the resource data with the other device, but instead, for example, can advertise its resources somewhere for other devices to discover. For example, a .NET service (.NET Devices) is provided that centrally stores device resource capabilities such that data may be appropriately formatted before sending it to a device, e.g., so as to not send high-resolution graphics to a device incapable of displaying them. A similar .NET Resources service, or an extended .NET Devices service, may be provided to advertise this information to other devices.

The following tables set forth some example schemas that may be used (e.g., with XML-formatted data) to exchange resource (storage and processing power) information regarding a user's devices, which in this example include work and home personal computers, and a cellular telephone:

```
<myStorage>
    <device name="Work PC" uuid="7a733d84-b394-4ba1-56b5c0d">
        <driveSize/>
        <freeSpace/>
        <transferSpeed/>
        <seekLatency/>
    </device>
    <device name"Home PC" uuid="6d733d84-b3f4-4ba1-56b5c0f">
        <driveSize/>
        <freeSpace/>
        <transferSpeed/>
        <seekLatency/>
    </device>
    <device name="Cell Phone" uuid="5f733d84-b3f4-4ba1-56b5c0f">
        <driveSize/>
        <freeSpace/>
        <transferSpeed/>
        <seekLatency/>
    </device>
</myStorage>
<myProcessingPower>
    <device name"Work PC" uuid="7a733d84-b394-4ba1-56b5c0d">
        <cpuSpeed/>
        <cpuUsage/>
        <memorySize/>
        <memoryUsage/>
    </device>
    <device name="Home PC" uuid="6d733d84-b3f4-4ba1-56b5c0f">
        <cpuSpeed/>
        <cpuUsage/>
        <memorySize/>
        <memoryUsage/>
    </device>
    <device name="Cell Phone" uuid="5f733d84-b3f4-4ba1-56b5c0f">
        <cpuSpeed/>
        <cpuUsage/>
        <memorySize/>
        <memoryUsage/>
    </device>
</myProcessingPower>
```

As is understood, the schema is preferably resource based, i.e., multiple devices may be listed for each resource type, to match the general concept of an identity having distributed resources available for use, independent of the actual device on which the resource exists. Notwithstanding, the present invention is not limited to any particular schema and/or formats, e.g., the schemas may be device-based, such that each device may instead provide its list of available resources to other devices such that the same information is known.

Figure 3:
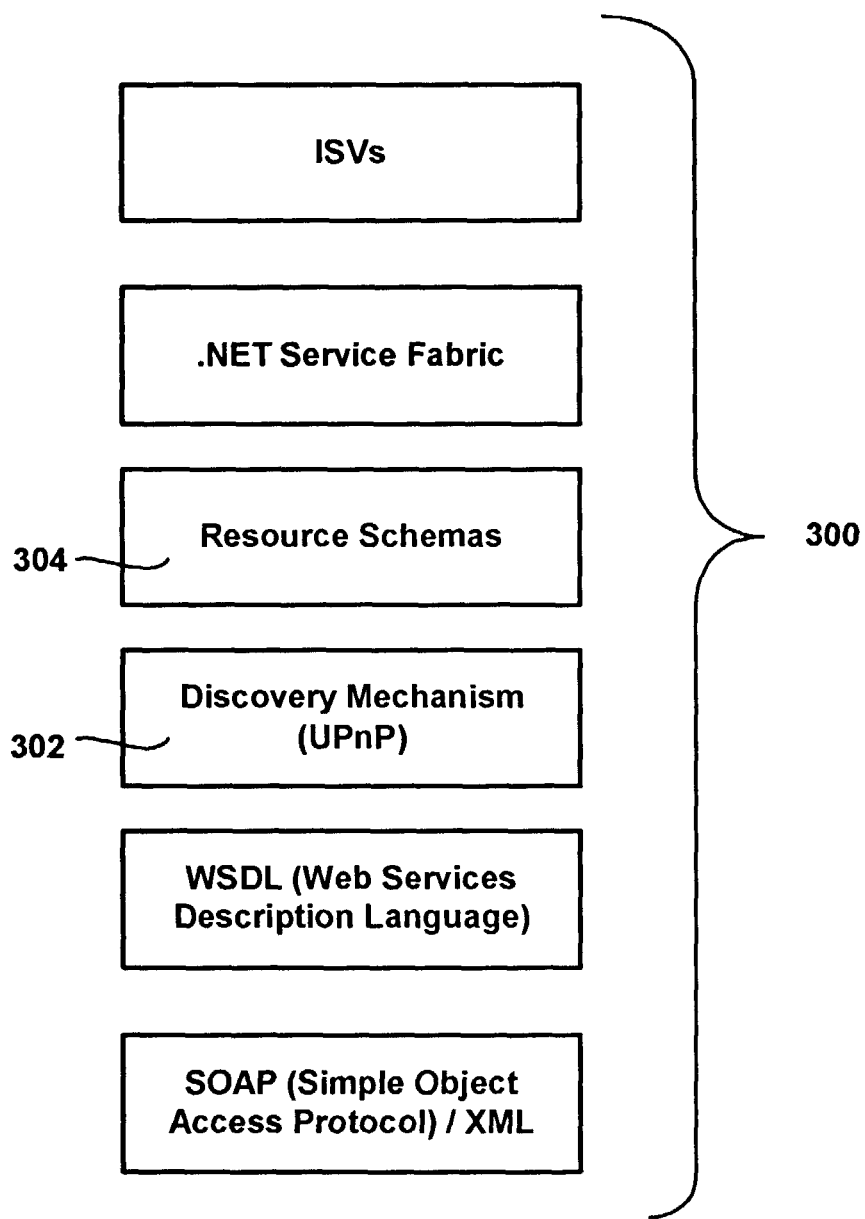
FIG. 3 is a block diagram generally representing an architecture for discovering and exchanging resource information in accordance with an aspect of the present invention.

As generally represented in FIG. 3, an architecture 300 is provided in order for devices to participate in an intelligent distributed computing model, in which various aspects of the participating devices are abstracted and made programmatically addressable from a different device. A universal plug-and-play (UPnP 2.0) infrastructure or the like may be used as the basic, low-level mechanism 302 for discovery of these resources. Alternatively, the list of resources for various computing devices may be cached in some well-known location, such as an Active Directory store, to enable querying of remote resources even if the device is only accessible through some intermediary such as a firewall or wireless hub. Atop the discovery mechanism are the schemas 304, e.g., one schema associated with each specific type of the computing resource, with each of those schemas exposed, for example, as in the .NET architecture.

Note that while UPnP provides a suitable discovery mechanism 304, it is only part of the process of actually using the remote computing resources. Thus, UPnP and .NET technologies are used to facilitate resource sharing, but are not used to actually employ the resources available on a device. Rather, once the resources are known, appropriately focused protocols for that specific resource domain are used. By way of example, UPnP, with the addition of the .NET identityHeader, endpointHeader, and requestHeader SOAP semantics, is well-suited to obtain the video screen characteristics of the remote device, however a protocol such as RDP will be used to transfer video data after the initial discovery and handshaking occurs between the devices. Note that this is similar to the way .NET approaches data services today, e.g., .NET provides a mechanism to connect to an electronic endpoint representing a proprietary (e.g., Messenger) protocol, but once that endpoint is connected, .NET allows the client to use an existing real-time protocol. Other protocols appropriate for other types of resources are used, e.g., CIFS+ for storage, which scales well to both corporate and home storage scenarios and enables the user's file system to continuously expand to other storage devices, without forcing the user to deal with drive letters, namespaces, and so forth. In summary, the present invention provides an identity-based approach to discovering these additional resources that are available for use, but does not thereafter directly deal with their use.

Figure 6:
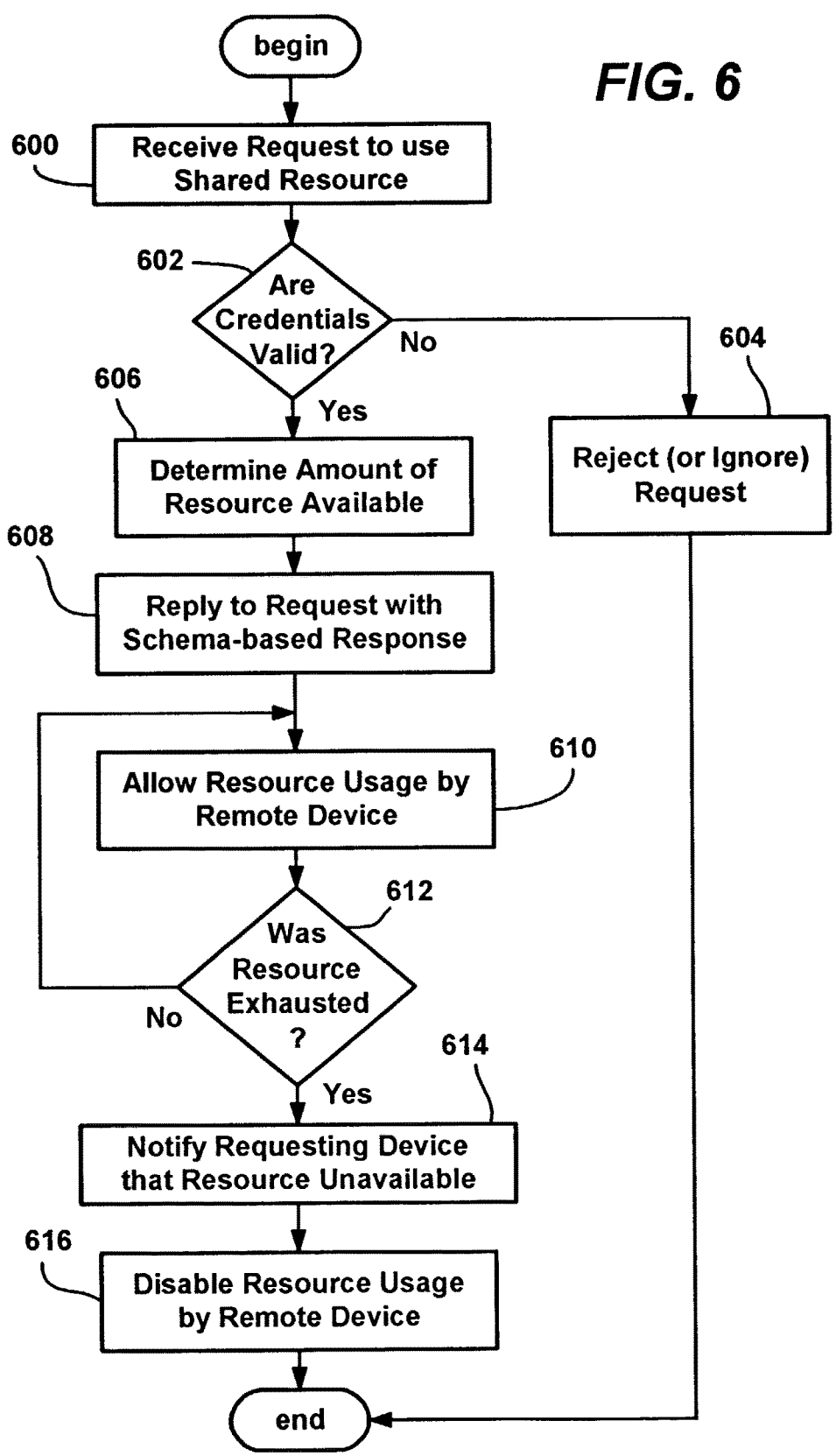
FIG. 6 is a flow diagram representing exemplary logic and related operations performed to facilitate the sharing of resources in a distributed computing environment in accordance with an aspect of the present invention.

FIG. 6 is an example flowchart that represents some general aspects of the present invention, beginning with step 600 which represents receiving a request to use a shared resource. The request may be general, e.g., requesting the list of resources that a user has available on devices configured to participate, or may be a request for a specific resource, e.g., in response to an advertisement. For purposes of this example, the request is treated as a request for one specific resource.

Step 602 represents the evaluation of the credentials, such as provided by the Microsoft .NET Passport authentication service. The request may include the credentials, or the credentials may be separately exchanged, e.g., before, as part of, or after step 600. If not valid at step 602, step 602 branches to step 604 which represents rejecting the request. Note that depending on a given environment, the request without proper credentials may be ignored rather than specifically rejected.

If valid, step 606 is executed, and represents determining the amount of the requested resource that is available. For example, a resource such as storage may be limited because it has only limited free space, and further, a device may be configured to make only part of its storage space available for sharing, reserving the rest for itself. A resource such as processor cycles may be made available only to the extent the processor is not being otherwise used, and even then may be further limited so that another device can only take up to a maximum amount of the unused cycles. Any resource may have a time-out value associated with it, which may be further contingent upon its use, e.g., storage can be shared for no more than one hour per request, and the request will be terminated if no file system requests are detected at least every two minutes. In this manner, a device may be configured to share its resources to an extent controlled by its owner/administrator.

Note that the resource access may be dynamic, e.g., unused processor cycles may be shared, however CPU usage is a number that fluctuates, and the requesting guest device may be prioritized along with other devices and/or processes on the device that is sharing the CPU. For example, guest users may only consume a controllable percentage of resources when the owner of the device is not otherwise using them, such as bandwidth or processing power. Both CPU and bandwidth are examples of resources which are scheduled according to time constraints (e.g., cycles or bits per second) rather than non-time-based resources such as disk or memory usage. As a result, the scheduling mechanisms for time-based resources in general will be fundamentally different than for non-time-based resources. Note that kiosk locations would enable many scenarios that would be useful to such guests. A resource such as a display monitor may be either entirely available for sharing or not at all, depending on whether or not it is presently being used. Thus, although not represented in FIG. 6, step 606 may also reject (or ignore, if appropriate) a request when there is no amount of a requested resource available for sharing. Step 608 represents returning a response to the requesting entity, preferably the schema-based response that provides the resource capability data to the requesting entity.

Step 610 represents allowing the requested resource to be shared, and includes, for example, the exchange of data between the requesting device and the sharing device so that the sharing performs some corresponding task for the requesting device. Step 612 tests whether the resource was exhausted, e.g., timed out or is no longer available. Note that this is shown as a loop in FIG. 6 for purposes of simplicity, however it is readily understood that the actions may be event driven. Further, a step (such as step 606) may be included in the loop/used to fire the event, e.g., the resource usage is dynamically monitored to determine when it is exhausted for the particular request. Note that a resource may be directly exhausted when the requesting entity informs the device that the resource is no longer needed.

Step 614 represents notifying the requesting device that the resource is no longer available for its use. Step 616 represents disabling the resource usage, so that, for example, once exhausted the requesting device will need to make a new request if it wants to share resources.

Figure 4:
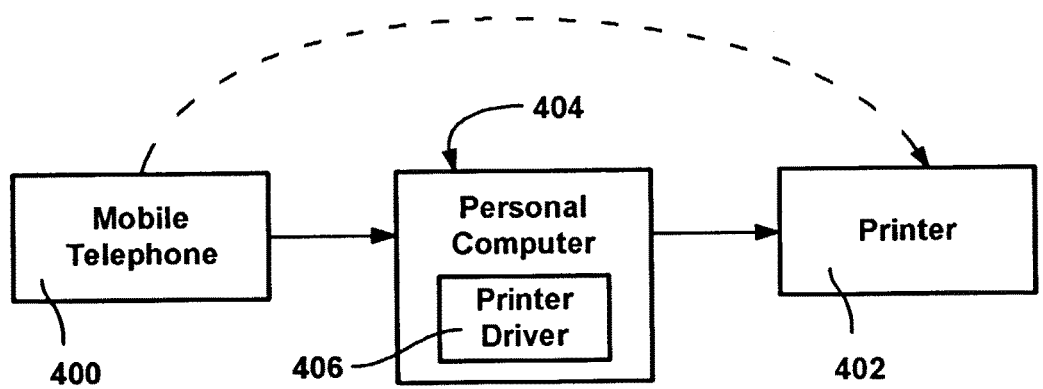
FIGS. 4 and 5 are block diagrams representing examples of how the present invention can improve a user computing experience by distributing computing operations to resources, in accordance with an aspect of the present invention.
Figure 5:
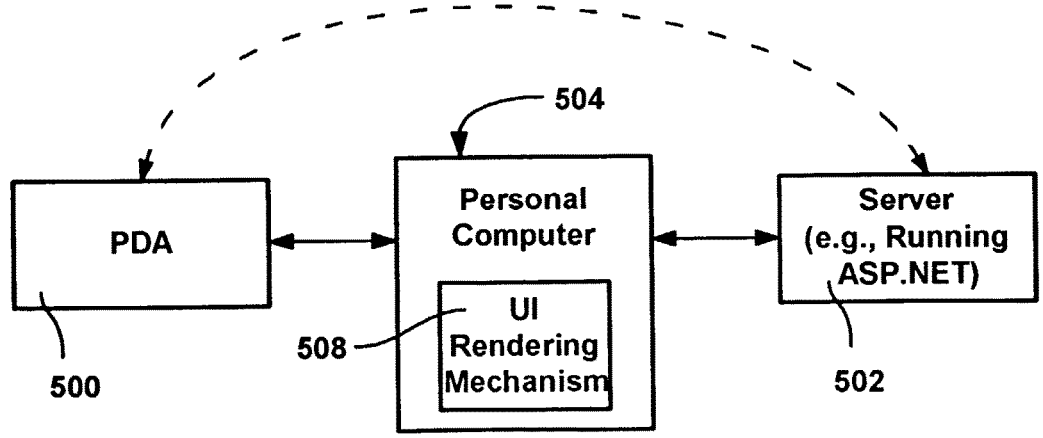

FIGS. 4 and 5 provide examples of some of the many possible uses of the present invention. As will be understood from the examples of FIGS. 4 and 5, integrating computational proxy support into a network edge device or appliance may result in a better user experience for users of an internal network.

In a first example represented in FIG. 4, a small mobile device 400 (such as a mobile telephone) wants to print to a printer 402, however the small device 400 does not have an appropriate printer driver. This may be because the mobile device 400 does not have sufficient memory to install and maintain a printer driver needed for that printer 402, and/or does not have an easy way for the needed printer driver to be installed, and/or for other reasons. Note that this is a real scenario, and one proposed solution is to emit XHTML-PRINT as a simplified PDL (Page Description Language) from the mobile device 400 to the printer 402, e.g., over some network connection (shown via the dashed line in FIG. 4). Although XHTML-PRINT is adequate to an extent, this solution has a number of drawbacks, e.g., XHTML-PRINT is not WYSIWYG, cannot control line breaks, and generally provides a poor user experience.

However, if via the present invention, the mobile device 400 first dynamically discovers a personal computer 404 equipped with a proper printer driver 406, (and which the mobile device user is authorized to use), the mobile device 400 instead provides printing data via the personal computer 404 to the printer driver 406, which in turn will create a WYSIWYG output using PCL, Postscript or rasterization. As mentioned above, the present invention provides the discovery mechanism, and thereafter the mobile device 400 may communicate in any way with the personal computer 404, such as by a lightweight PDL that has much higher-fidelity (relative to XHTML-PRINT). The result is high-quality output rendered very quickly, by leveraging the faster processor and proper printer driver 406 in the personal computer 404.

FIG. 5 demonstrates a second example, generally directed to providing an improved user experience when operating a PDA (personal digital assistant) 500 that is to be executing managed code remotely on a server 502 (e.g., an ASP.NET server). One way to accomplish this is to have the PDA connect to the server to run the managed code, (e.g., by leveraging Mobile Controls support in ASP.NET), with the results transmitted as HTML, as indicated by the dashed line in FIG. 5. The server 502 dynamically scales the HTML content to the appropriate screen size of the device 500, without the ISV creating special-purpose code for each device 500. However, this requires many round trips with the server 500, with the screen flashing for updates, and generally provides a degraded user experience.

An improved solution provided by the present invention is accomplished by having the PDA dynamically discover that a personal computer 504 associated with the user's identity can be a proxy for a number of computational resources, as generally represented in FIG. 5. In such an event, the PDA issues an HTML request for a remote page via the proxy personal computer 504. The personal computer 504 intercepts the request and starts a session with the remote server 502 to offload the UI rendering managed code, e.g., using WSDL as the protocol to the server 502. Typically, the bandwidth from the proxy personal computer 504 to the server 502 will be less than the bandwidth from the PDA device 500 to the proxy personal computer 504, whereby the smaller amount of data transferred over the slower link to and from the server 502 results in a more responsive user interface when displayed on the PDA 500, providing an improved user experience. Of course, the two bandwidths can be first evaluated to ensure that the proxy solution is the more-optimal one.

Further, note that if the PDA 500 was equipped with locally-running controls that the server was able to leverage, an even better experience may be provided. For example, ASP.NET automatically leverages any local controls (e.g., such as a date picker control) running locally on a PDA running a Windows®-based operating system. This results in even less round trips to the server 502 and/or proxy 504, with less resultant screen updating/flashing.

As can be appreciated, there are numerous other examples that are enabled by having computing resources revolve around an identity, instead of around the particular devices those resources ship with. The resource schemas and service fabric are not limited to simply describing the resources, but also include elements to assist those resources working together. This can be appreciated from the following two types of scenarios, namely a set of real-time scenarios in which the user is interacting with a remote computing device in real-time, and a set of scheduled or predicted scenarios. An example of a predicted scenario may include a storage load balancing mechanism that occasionally runs on a home network, to make sure that one computing device's free storage space is not going to run out while another drive has plenty of room.

Thus, a rich schema may provide data that goes beyond describing the resources themselves, such as methods to schedule, at a particular time or at regular intervals, prioritization machinery, and data indicating how to deal with possible contention between real-time and predicted tasks, or multiple such tasks. The schema may provide for the concept of cost, e.g., if two connections are available to the Internet, it is valuable to recognize that the user may be paying one price for unlimited access but another price for an amount of data transferred over a different mechanism, and select the better option.

Replication/sharing by a logging system may be used to understand how users are interacting with their devices, and to achieve a consolidated view of how a user operates, rather than have only disparate views separated by device. This data is appropriately known to many devices, and will provide an automatic way for such data to be consolidated. Prediction optimizations may be saved and exchanged based on monitored usage, e.g., if the system knows that a user manually downloads particular information to a hand-held computer every Friday before leaving work, the system can start the download during device idle time so the "synchronization" appears instantaneous. End user options/settings/preferences is also valuable information for the shared environment, e.g., what is a desirable or even necessary feature for some users is undesirable or even annoying to others. By maintaining this data, the end user has the power to be in control of their experience. Also, in a typical environment, there will be at least one rich client that uses the protocol/schema to perform system management, where "system" refers to the overall set of resources associated with an identity. Algorithms and methods can use the schema for predicting such operations.

As is understood, there are many valuable scenarios enabled by through abstracting device resources and aggregating them around an identity. A number of examples are provided, however the list should not be considered exhaustive or in any way limiting, but rather serves to illustrate some of the many benefits and advantages of the present invention. As examples mentioned above, a device with a small computer screen may leverage an unused computer monitor connected to a personal computer for better display, use resources of a proxy to facilitate a better display on its own display (FIG. 5) or print to a printer even without printer driver, by connecting to a printer via a personal computer that does have the correct driver (FIG. 4).

Other examples can be seen in a very low-powered device, such as a mobile telephone, performing complex computations by using the memory and CPU of a personal computer. Stored data can be automatically and transparently moved from a first hard drive to a second when the first hard drive is getting full, including, for example, from personal digital video recorders that record video programming and need to delete old shows to make room for more recent recordings. The present invention instead moves those older shows to another storage, rather than delete them. A portable audio player need not be able to play any type of physical media, but can instead receive and buffer audio streamed to it from a personal computer and play the audio from memory.

Other examples include allowing users to easily access their files from any device regardless of where it is stored; for example, while on the road with only a small personal computer, being able to easily open files stored on a home personal computer or work personal computer, (independent of centralized .NET data storage). A user may see all of the free space in various devices, including in various public sharepoints on a corporate network. A large-screen TV connected to an appropriate device may be used to view photographs saved on a personal computer folder, run a slideshow, watch home movies or movie trailers saved on a personal computer, and so on.

Figure 7:
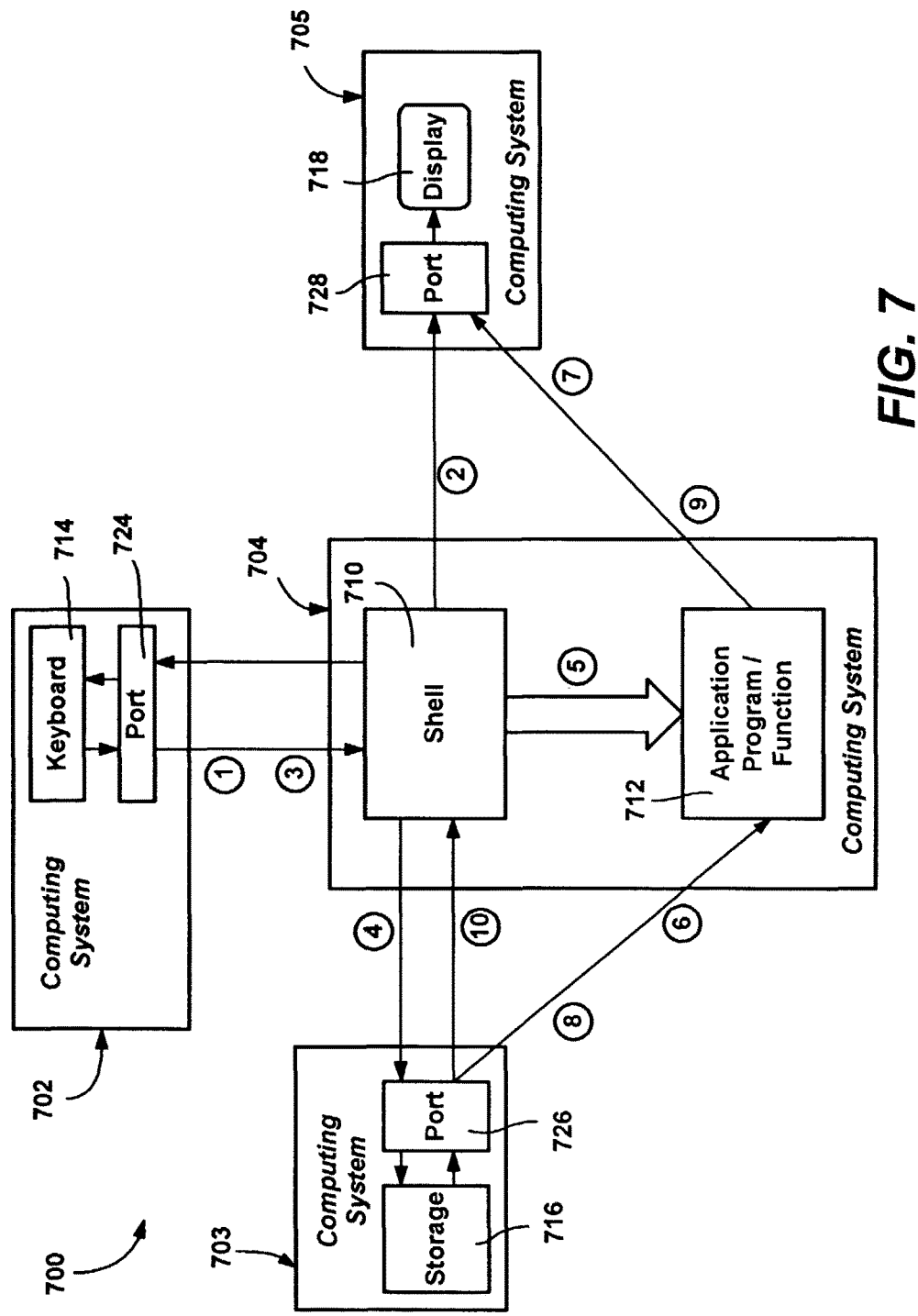
FIG. 7 is a block diagram generally representing an example implementation including resources distributed in accordance with an aspect of the present invention.

FIG. 7 provides a demonstration of an implementation 700 run using four interconnected computing systems, 702-705. The implementation 700 includes a command shell 710 and application program 712 (or similar function code) on the computing system 704, a keyboard resource 714 on the computing system 702, a storage (e.g., disk) 716 on the computing system 703, and a display 718 on the computing system 705. Thus, in this example the resources are distributed such that there is an input resource the on computer 702, storage resource on the computer 703, and an output resource on the computer 704. The computer 704 acts as a coordinating authority for the implementation 700. Although the resources are on different computer systems, the resources are accessed in accordance with the present invention to essentially form a single functioning system.

The shell resource 710 calls the application 712, and also connects to the other devices' resources through ports 724, 726 and 728, conceptually represented in FIG. 7 as one port per resource, although a separate input and output port may be provided. Ports essentially comprise structured queues that can be written (output) to or read (input) from via a handle to that port. Ports are mobile, data is not lost, and security can be associated with a port such that no one except the intended entity will see the data intended for it.

The shell 710 used in the implementation 700 is based on a programming language referred to as xSpresso, as described in U.S. provisional patent application Ser. No. 60/379,864, filed on May 10, 2002 and herein incorporated by reference in its entirety. In general, xSpresso is directed to a programming language and runtime that brokers control and data flows among asynchronous system components. Among other things, xSpresso expresses the cooperative dimensions of programs or services, including ordering and timing, that can be programmatically verified. The language may programmatically express the passing of an organizational scheme formed from a customizable tag-based language such as XML.

In the example of FIG. 7, the numbered arrows labeled 1-4 and 6-10 represent an example of the various communications between the ports 724, 726 and 728 and the shell 710, to display the text data of a file in the storage 716 to the display 718, e.g., similar to the well-known "type" function. In the example of FIG. 7, a user of the keyboard resource 714 initiates the operation by typing the word "type" on the keyboard 714 (arrow labeled one (1)). The shell 710 receives this via the port 724 and communicates data to the port 728 for display on the screen 718, (arrow labeled two (2)), e.g., to echo what the user has input and/or to prompt for a filename of a file that stores the text that the user wants to have displayed. In FIG. 7, the arrow labeled three (3)

represents the user typing in the filename, such as corresponding to an XML file, which may also be echoed (not separately labeled).

With the filename, the shell 710 then writes data (represented by arrow labeled four (4)) to the port 726 that corresponds to the storage (e.g., disk) resource 716, which results in a read request to the storage's file system. In parallel, the shell 710 calls (the wide arrow labeled five (5)) the application program 712 to receive and output the read data. In response, the storage resource 716 begins outputting data via port 726 to the application program 712, which in turn outputs it to the port 728 of the display resource 718, as represented by the arrows labeled six (6) and seven (7). The arrows labeled eight (8) and nine (9) represent the rest of the data being transferred in a similar manner. The arrow labeled ten (10) represents the status (e.g., success) code being returned to the shell 710.

In keeping with the present invention, storage, input and output can be placed on different systems, with no change to the implementation. Legacy interoperability may be provided via common language runtime (CLR) classes that represent common legacy components (e.g., the keyboard, console and storage). System dispersion is provided in a local and transparently distributed implementation, as is explicit handling of concurrency and message-passing.

As can be seen from the foregoing detailed description, there is provided a method and system for distributed computing of device resources based around the concept of identity. The method and system abstracts the resources of a computer from the individual devices in a manner that provides numerous benefits to a user and generally improves the user's computing experience. The method and system are schema-based, and are extensible and highly flexible.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
   discovering, at a first computing device, a resource located at a second computing device;
   communicating a request to the second computing device to employ the resource located at the second computing device;
   communicating identity information to the second computing device to enable the second computing device to determine whether the first computing device has access to the resource based on the identity information;
   receiving data from the second computing device when the second computing device approves access to the resource by the first computing device, the data including resource information associated with the resource at the second computing device formatted according to a resource-based schema understood by the first computing device, the resource-based schema being organized by resource and including information about the second computing device that corresponds to respective resources;
   interpreting the data to access the resource located at the second computing device; and
   executing a process, at the first device, using the resource of the second computing device.

2. The method of claim 1 wherein the first computing device uses the resource until the second computing device disables access to the resource by the first computing device.

3. The method of claim 2 further comprising informing the second computing device that the first computing device no longer needs to use the resource effective to cause the second computing device to disable the access to the resource.

4. The method of claim 1 wherein the identity information corresponds to credentials.

5. The method of claim 4 wherein the credentials are provided by an authentication service.

6. The method of claim 1 wherein the resource of the second computing device comprises a processing resource, a storage resource, a memory resource, or a bandwidth resource.

7. The method of claim 1 wherein executing the process comprises accessing a web page at a remote server using bandwidth of the second computing device.

8. The method of claim 7, wherein the second computing device acts as a proxy to the remote server for the first computing device.

9. The method of claim 7 wherein bandwidth from the second computing device to the remote server is greater than bandwidth from the first computing device to the remote server.

10. A method for sharing resources between computing devices, comprising:
    receiving a request from a first computing device at a second computing device to employ a resource located at the second computing device, the request including identity information associated with the first computing device, the identity information including a first credential provided by an authentication service;
    determining, by the second computing device, whether the first computing device is permitted to access the resource based on the identity information, the determining the access comprising validating the first credential;
    sending, by the second computing device, resource information associated with the resource to the first computing device responsive to determining that the first computing device is permitted to access the resource, the resource information formatted according to a resource-based schema understood by the first computing device, the resource-based schema being organized by resource and including information about the second computing device in relation to respective resources;
    allowing, by the second computing device, the first computing device to access the resource to execute a process by employing the resource; and
    dynamically monitoring the resource to determine whether the resource is exhausted for the request.

11. The method of claim 10 further comprising determining that the resource is no longer available to the first computing device when a time limit to access the resource by the first computing device expires.

12. The method of claim 10 wherein the resource located at the second computing device comprises a processing resource, a storage resource, a memory resource, or a bandwidth resource.

13. The method of claim 10 wherein allowing the first computing device to access the resource to execute the process by employing the resource further comprises allowing the first computing device to access a web page at a remote server using bandwidth of the second computing device.

14. The method of claim 13, wherein the second computing device acts as a proxy to the remote server for the first computing device.

15. The method of claim 13 wherein bandwidth from the second computing device to the remote server is greater than bandwidth from the first computing device to the remote server.

\* \* \* \* \*